United States Patent
Bae et al.

(10) Patent No.: US 10,215,968 B2
(45) Date of Patent: Feb. 26, 2019

(54) OPTICAL LENS ASSEMBLY AND ELECTRONIC DEVICE INCLUDING THE SAME

(71) Applicant: Samsung Electronics Co., Ltd., Suwon-si, Gyeonggi-do (KR)

(72) Inventors: Jae-cheol Bae, Suwon-si (KR); Shi-hong Park, Suwon-si (KR); Ki-woo Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/696,548

(22) Filed: Sep. 6, 2017

(65) Prior Publication Data
US 2018/0081149 A1    Mar. 22, 2018

(30) Foreign Application Priority Data

Sep. 21, 2016 (KR) .......................... 10-2016-0120750

(51) Int. Cl.
| | |
|---|---|
| *G02B 13/00* | (2006.01) |
| *G02B 7/02* | (2006.01) |
| *G02B 9/64* | (2006.01) |
| *G02B 13/02* | (2006.01) |
| *G02B 27/00* | (2006.01) |

(52) U.S. Cl.
CPC ........... *G02B 13/009* (2013.01); *G02B 7/021* (2013.01); *G02B 9/64* (2013.01); *G02B 13/0045* (2013.01); *G02B 13/0065* (2013.01); *G02B 13/02* (2013.01); *G02B 27/0018* (2013.01)

(58) Field of Classification Search
CPC .............. G02B 13/009; G02B 13/0045; G02B 27/0018; G02B 13/02; G02B 9/64; G02B 7/021; G02B 13/0065
USPC ........................................ 359/642, 726, 733
See application file for complete search history.

(56) References Cited

U.S. PATENT DOCUMENTS

| | | | |
|---|---|---|---|
| 9,316,810 B2 | 4/2016 | Mercado | |
| 9,897,780 B1 * | 2/2018 | Bone | ........................ G02B 9/34 |
| 2015/0253647 A1 | 9/2015 | Mercado | |
| 2016/0044250 A1 | 2/2016 | Shabtay et al. | |

* cited by examiner

*Primary Examiner* — Tuyen Tra
(74) *Attorney, Agent, or Firm* — Jefferson IP Law, LLP

(57) ABSTRACT

A curved-type optical lens assembly and an electronic device are provided. The optical lens assembly focuses an image of an object on the image sensor. The optical lens assembly includes a reflector configured to reflect incident light, a lens array including a plurality of lenses arranged between the reflector and the image sensor, a first light blocker arranged at an object side of the reflector to block the light, and a second light blocker arranged at an image side of the reflector to block the light. The optical lens assembly further includes a first optical axis of the light proceeding towards the reflector and a second optical axis of the light reflected by the reflector.

20 Claims, 13 Drawing Sheets

OPTICAL LENS ASSEMBLY AND ELECTRONIC DEVICE INCLUDING THE SAME

CROSS-REFERENCE TO RELATED APPLICATION(S)

This application claims the benefit under 35 U.S.C. § 119(a) of a Korean patent application filed on Sep. 21, 2016 in the Korean Intellectual Property Office and assigned Serial number 10-2016-0120750, the entire disclosure of which is hereby incorporated by reference.

TECHNICAL FIELD

The present disclosure relates to an optical lens assembly and an electronic device including the same. More particularly, the present disclosure relates to a curved-type telephoto optical lens assembly and an electronic device including the same.

BACKGROUND

The number of services and additional functions provided by an electronic device is gradually expanding. An electronic device, e.g., a mobile device or a user device, may provide various services by using various sensor modules. An electronic device may provide a multimedia service, for example, a picture service or a video service. With the wide use of electronic devices, use of a camera functionally connected to an electronic device is increasing. According to user demand, camera performance and/or resolution in an electronic device is being improved. Various kinds of scenes, people, or selfies may be captured by a camera of an electronic device. In addition, such multimedia, for example, pictures or videos, may be shared on social network sites or via other media.

As semiconductors and display technology have improved, various cameras for mobile devices, e.g., from low resolution to high resolution, from small sensor format to large sensor format, for example, from a ⅛" sensor to ½" sensor, and from a telephoto lens to a super-wide angle lens, have been developed.

Since use of a camera in a portable device has increased, demand for a zoom magnification of the camera has increased with demand for miniaturization of the camera. Recently, it has been suggested that a wide camera and a telephoto camera be arranged as a dual module in order to obtain a high resolution zoom image in a small mobile device. However, it is difficult to miniaturize a telephoto lens for obtaining a zoom image of high magnification. In addition, even when an optical lens assembly is miniaturized, image quality may degrade due to ghost light.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an optical lens assembly and an electronic device including the same.

Another aspect of the present disclosure is to provide a curved-type optical lens assembly that is miniaturized in, for example, an electronic device (e.g., a portable terminal).

Another aspect of the present disclosure is to provide an electronic device including, for example, a curved-type telephoto optical lens assembly.

Another aspect of the present disclosure is to provide an electronic device including a plurality of optical lens assemblies so as to perform a multi-module zoom image capturing.

In accordance with an aspect of the present disclosure, an optical lens assembly for focusing an image of an object on an image sensor is provided. The optical lens assembly includes a reflector configured to reflect incident light, a lens array including a plurality of lenses arranged between the reflector and the image sensor, a first light blocker arranged at an object side of the reflector and configured to block light, and a second light blocker arranged at an image side of the reflector and configured to block light, wherein the optical lens assembly comprises a first optical axis of light proceeding towards the reflector and a second optical axis of light reflected by the reflector, and satisfies the following condition/equation.

$$a\tan(LT1D/LT2D) \times 180/\pi > VHFOV \qquad \text{Equation 1}$$

The equation above assumes that a point where a first straight line extends from a first point of the first light blocker towards the first optical axis, wherein the first point is away from the image sensor based on the first optical axis on a cross-section of the optical lens assembly taken along the short side direction of the image sensor, in parallel with the first optical axis and a second straight line extends from a second point of the second light blocker towards the second optical axis, and wherein the second point is adjacent to the first point based on the second optical axis, in parallel with the second optical axis meet each other is a point D, LT1D denotes a distance from the first point to the point D, LT2D denotes a distance from the second point to the point D, and VHFOV denotes a half field of view in the short side direction of the image sensor.

The optical lens assembly may satisfy the following conditions/equations.

$$LTTL/TTL < 0.5 \qquad \text{Equation 2}$$

$$D1/D2 < 0.95 \qquad \text{Equation 3}$$

In the equation above, LTTL denotes a distance from an object side surface of a lens closest to the object side from among a plurality of lenses to an image side surface of a lens closest to the image side, TTL denotes a distance from the object side surface of the lens closest to the object side to the image sensor, D1 denotes an effective diameter of the lens closest to the object side, and D2 denotes an effective diameter of a second lens from the object side.

In accordance with an aspect of the present disclosure, an electronic device is provided. The electronic device includes an optical lens assembly configured to image an object, and an image sensor configured to receive light focused by the optical lens assembly, wherein the optical lens assembly includes: a reflector configured to reflect incident light, a lens array including a plurality of lenses arranged between the reflector and the image sensor, a first light blocker arranged at an object side of the reflector and configured to block light, and a second light blocker arranged at an image side of the reflector and configured to block light, and the optical lens assembly comprises a first optical axis of light proceeding towards the reflector and a second optical axis of light reflected by the reflector, and the optical lens assembly satisfies the following condition/equation.

$$a\tan(LT1D/LT2D)\times 180/\pi > VHFOV \qquad \text{Equation 1}$$

The equation above assumes that a point where a first straight line extends from a first point of the first light blocker towards the first optical axis, wherein the first point is away from the image sensor based on the first optical axis on a cross-section of the optical lens assembly taken along the short side direction of the image sensor, in parallel with the first optical axis and a second straight line extends from a second point of the second light blocker towards the second optical axis, wherein the second point is adjacent to the first point based on the second optical axis, in parallel with the second optical axis meet each other is a point D, LT1D denotes a distance from the first point to the point D, LT2D denotes a distance from the second point to the point D, and VHFOV denotes a half field of view in the short side direction of the image sensor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
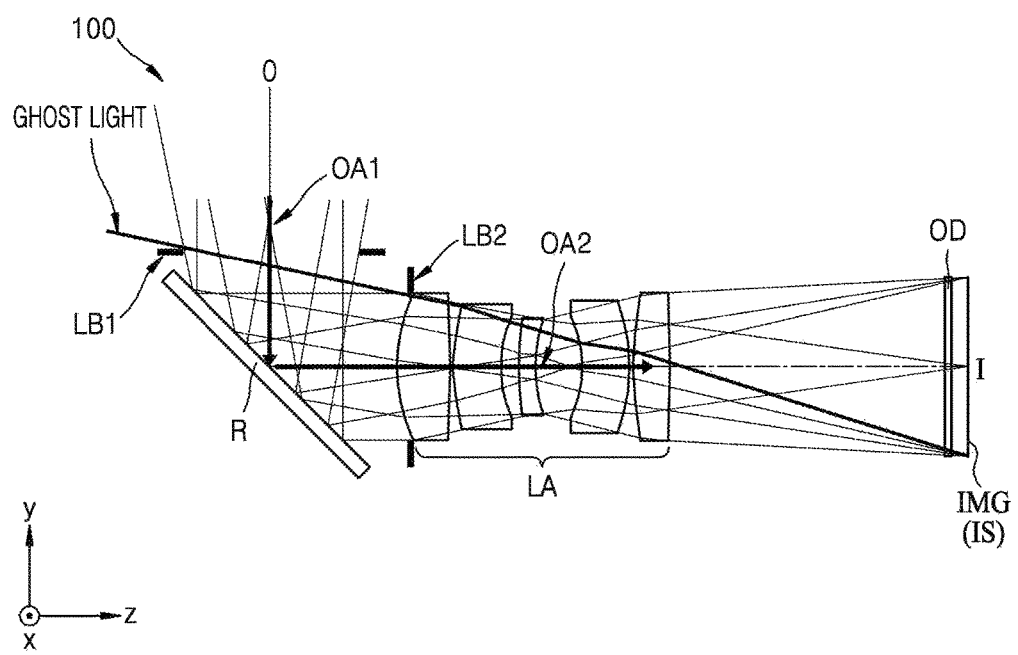
FIG. 1 is a diagram of an optical lens assembly according to an embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the terms "comprise" and/or "have," when used in this specification, specify the presence of stated features, integers, steps, operations, elements, and/or components, but do not preclude the presence or addition of one or more other features, integers, operations, elements, components, and/or groups thereof.

As used herein, the term "A or B", "at least one of A and/or B", or "one or more of A and/or B" includes any and all combinations of one or more of the associated listed items. For examples, "A or B", "at least one of A and B", "at least one of A or B" each may include (1) at least one A, or include (2) at least one B, or include (3) both at least one A and at least one B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, according to various embodiments of the present disclosure, a first component may be denoted a second component, and vice versa without departing from the scope of the present disclosure.

When a component (e.g., a first component) is "(operatively or communicatively) connected to or coupled to" another component (a second component), the component may be directly connected or coupled to the other component, or other component(s) (e.g., a third component) may intervene therebetween. In contrast, when a component (e.g., a first component) is directly "connected to" or "directly coupled to" another component (e.g., a second component), no other intervening components (e.g., a third component) may intervene therebetween.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms as used in various embodiments of the present disclosure are merely for the purpose of describing particular embodiments and are not intended to limit the present disclosure to the various embodiments. As used herein, the singular forms are intended to include the plural forms as well, unless the context clearly indicates otherwise. Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in the present disclosure. In some cases, even the term defined in the disclosure should not be interpreted to exclude embodiments of the disclosure.

An electronic device according to various example embodiments of the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group (MPEG-1 or MPEG-2) audio layer-3 (MP3) player, a mobile medical device, a camera, and a wearable device. According to various example embodiments, the wearable device may include, for example, at least one of an accessory type (e.g., a watch, a ring, a bracelet, an anklet, a necklace, glasses, contact lenses, or a head-mounted device (HMD)), a fabric or clothing integrated type (e.g., electronic clothing), a body-mounted type (e.g., a skin pad, or tattoo), and a bio-implantable type (e.g., an implantable circuit), or the like.

According to some example embodiments, the electronic device may, for example, be a home appliance. The home appliance may include at least one of, for example, a television (TV), a digital versatile disc (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another example embodiment, the electronic device may include, for example, at least one of various medical devices (e.g., various portable medical measuring devices (a blood glucose monitoring device, a heart rate monitoring device, a blood pressure measuring device, a body temperature measuring device, etc.), a magnetic resonance angiography (MRA) machine, a magnetic resonance imaging (MRI) machine, a computed tomography (CT) machine, and an ultrasonic machine), a navigation device, a global positioning system (GPS) receiver, an event data recorder (EDR), a flight data recorder (FDR), a vehicle infotainment device, electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, an electric or gas meter, a sprinkler device, a fire alarm, a thermostat, a streetlamp, a toaster, sporting goods, a hot water tank, a heater, a boiler, etc.).

According to some example embodiments, the electronic device may include, for example, at least one of a part of furniture or a building/structure, an electronic board, an electronic signature receiving device, a projector, and various kinds of measuring instruments (e.g., a water meter, an electric meter, a gas meter, and a radio wave meter). The electronic device according to various example embodiments of the disclosure may, for example, be a combination of one or more of the aforementioned various devices. The electronic device according to some example embodiments of the disclosure may be a flexible device, or the like. Further, the electronic device according to an example embodiment of the disclosure is not limited to the aforementioned devices, and may include a new electronic device according to the development of technology.

An electronic device according to various example embodiments will be described with reference to the accompanying drawings. As used herein, the term "user" may indicate a person who uses an electronic device or a device (e.g., an artificial intelligence electronic device) that uses an electronic device.

As used herein, the term "and/or" includes any and all combinations of one or more of the associated listed items. Expressions such as "at least one of," when preceding a list of elements, modify the entire list of elements and do not modify the individual elements of the list.

Hereinafter, an optical lens assembly and a device including the optical lens assembly according to various embodiments will be described with reference to accompanying drawings.

FIG. 1 is a diagram of an optical lens assembly 100-1 of a first numerical example according to an embodiment of the present disclosure.

The optical lens assembly 100 according to various embodiments may include a reflector R that reflects incident light and a lens array LA. The lens array LA may include a plurality of lenses. The reflector R may reflect incident light to bend an optical path. The reflector R may include, for example, a reflective mirror or a prism. The reflector R may not include a lens at an object side O. The optical lens assembly 100 according to various embodiments may include a first optical axis OA1 of light incident towards the reflector R and a second optical axis OA2 of light that has been reflected by the reflector R and has passed through a plurality of lenses. In the optical lens assembly 100 according to various embodiments, light may be directly incident to the reflector R without passing through the lenses.

The plurality of lenses may be arranged on the second optical axis OA2 from an object side O towards an image side I between the reflector R and an image plane IMG.

Hereinafter, when components of each lens are described, the image side I may denote a direction indicating an image plane IMG in which an image is focused and the object side O may denote a direction indicating an object. The object side may denote a direction indicating an object, and in other words, may denote a direction in which the light exits. In addition, an "object side surface" of a lens denotes a lens surface at a side where an object exists based on an optical axis, that is, a surface where the light is incident, and an "image side surface" of the lens denotes a lens surface towards the image plane IMG based on the optical axis, that is, a surface from which the light exits. Here, the optical axis may denote one optical axis in a state where the first optical axis OA1 and the second optical axis OA2 are unfolded. The image plane IMG may be, for example, an imaging device surface or an image sensor surface. An image sensor IS may include, for example, a sensor such as a complementary metal oxide semiconductor (CMOS) image sensor or a charge coupled device (CCD). The image sensor (IS) is not limited thereto, for example, may be a device converting an image of an object into an electric image signal.

Figure 2:
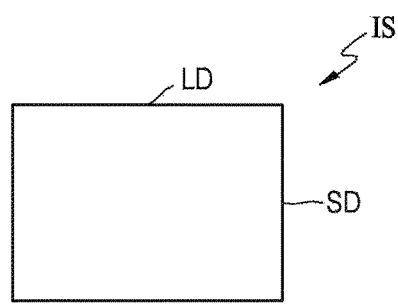
FIG. 2 is a schematic diagram of an image sensor in an optical lens assembly according to an embodiment of the present disclosure.

FIG. 2 is a schematic diagram of an image sensor in an optical lens assembly according to an embodiment of the present disclosure.

The image sensor IS may include, for example, short sides SD and long sides LD as shown in FIG. 2. FIG. 1 is a cross-sectional view of the optical lens assembly 100 taken along the short sides SD of the image sensor IS so as to include the first optical axis OA1 and the second optical axis OA2. x denotes the long side LD direction of the image sensor IS, y denotes the short side SD direction of the image sensor IS, and z denotes a proceeding direction of the light.

According to various embodiments, a first light blocker LB1 for blocking light may be arranged at the object side O of the reflector R. According to various embodiments, a second light blocker LB2 for blocking light may be arranged at the image side I of the reflector R.

The first light blocker LB1 and the second light blocker LB2 may reduce ghost light in a system in which the light is directly incident to the reflector R without passing through the lenses and the optical path is bent. The first light blocker LB1 and the second light blocker LB2 may have various shapes and include various materials, which will be described later.

According to the various embodiments, the lens array LA may include three or more lenses. For example, the lens array LA may include three to five lenses.

Figure 3:
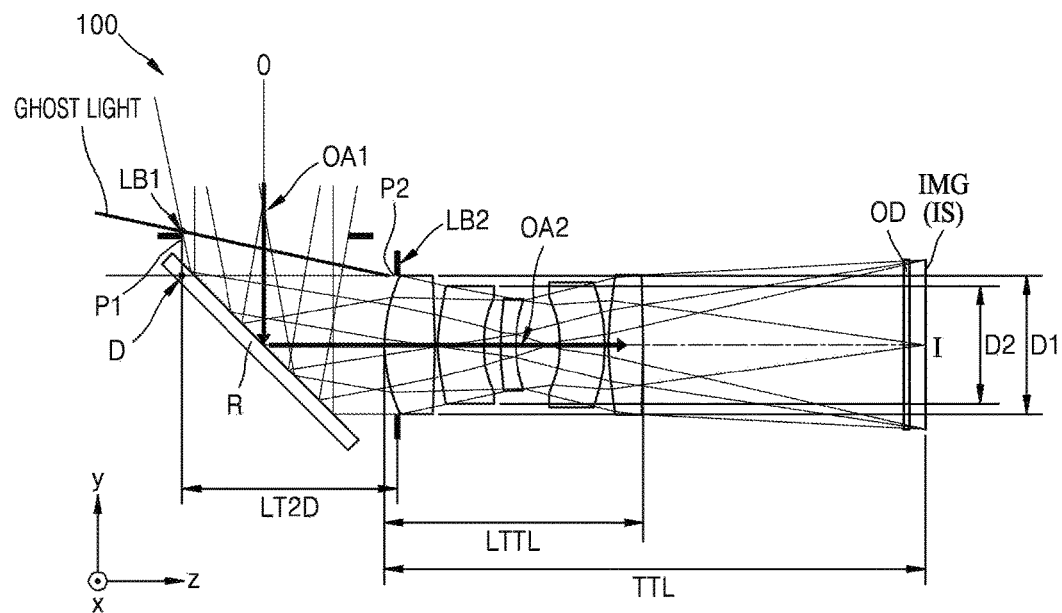
FIG. 3 is a diagram showing various dimensions of an optical lens assembly according to an embodiment of the present disclosure.

FIG. 3 is a diagram showing dimensions used in the optical lens assembly according to an embodiment of the present disclosure.

The first light blocker LB1 and the second light blocker LB2 may be arranged so as to prevent the ghost light that is incident directly without passing through the reflector R from being directly incident to the image sensor IS.

The optical lens assembly according to the various embodiments may satisfy following condition/equation.

$$a\tan(LT1D/LT2D) \times 180/\pi > VHFOV \quad \text{Equation 1}$$

Referring to FIG. 3, a point at which a first straight light extending from a first point P1 in parallel with the first optical axis OA1, and a second straight light extending from a second point P2 in parallel with the second optical axis OA2 meet each other is referred to as D, wherein the first point P1 faces the first optical axis OA1 of the first light blocker LB1 that is apart from the image sensor IS based on the first optical axis OA1, and the second point P2 faces the second optical axis OA2 of the second light blocker LB2 that is adjacent to the first point P1 based on the second optical axis OA2 on a cross-section of the optical lens assembly taken along the shorter side direction (y direction) of the image sensor IS. LT1D denotes a distance from the first point P1 to the point D, LT2D denotes a distance from the second point P2 to the point D, and VHFOV denotes a half field of view of the image sensor IS in the short side direction (y direction).

In a curved-type optical lens assembly that curves light that is directly incident to the reflector R without passing through a lens, ghost light may be directly incident to an image sensor IS. When the first light blocker LB1 and the second light blocker LB2 satisfy the condition 1, degradation of image quality due to the ghost light incident to the image sensor IS may be prevented.

The first light blocker LB1 and the second light blocker LB2 include a light shielding material, and shapes and structures thereof are not restricted provided that the condition 1 is satisfied.

FIG. 3 shows an example in which the first light blocker LB1 and the second light blocker LB2 are separately provided from other components of the optical lens assembly.

Figure 4:
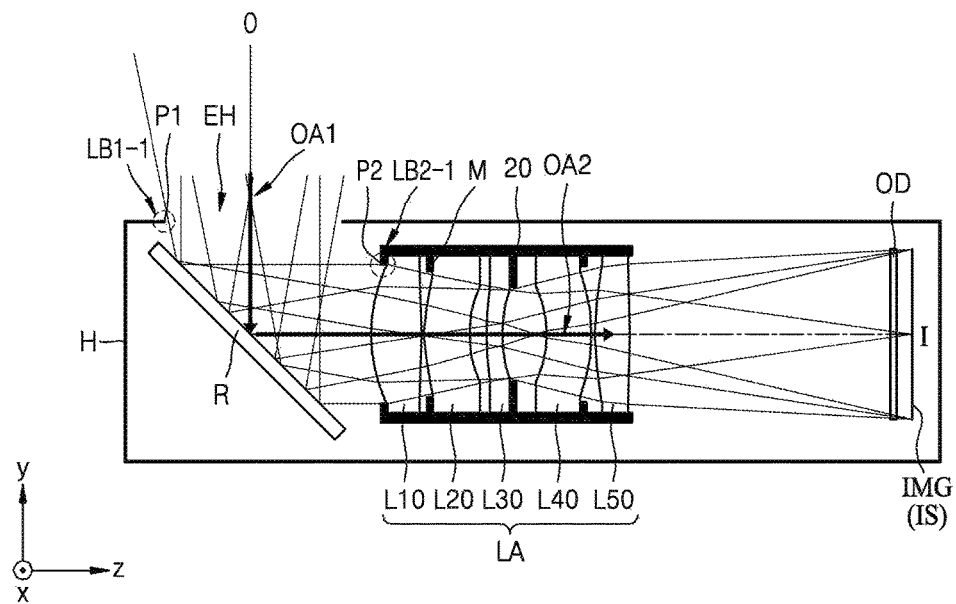
FIG. 4 is a diagram of an optical lens assembly according to an embodiment of the present disclosure.

FIG. 4 is a diagram of an optical lens assembly according to an embodiment of the present disclosure.

As another example of the first light blocker, referring to FIG. 4, a part of a case H may be provided as a first light blocker LB1-1 in an optical lens assembly 100-1 according to various embodiments. The case H may include an entrance hole EH to which the light is incident. An end portion of the case H at the entrance hole EH may be the first light blocker LB1-1. The case H may include a light shielding material, and a part of the case H that is apart from the image sensor IS based on the first optical axis OA1 may operate as the first light blocker. As shown in FIG. 4, on a cross-section of the optical lens assembly taken along the short side direction (Y direction) of the image sensor IS so as to include the first optical axis OA1 and the second optical axis OA2, an internal end portion of the entrance hole EH that is away from the image sensor IS based on the first optical axis OA1 may be the first point P1.

The optical lens assembly 100-1 according to various embodiment may further include a barrel 20 in which the lens array LA is mounted. The barrel 20 may include a mask M supporting the lenses, between the lenses of the lens array LA. Referring to FIG. 4, the lens array LA may include a first lens L10, a second lens L20, a third lens L30, a fourth lens L40, and a fifth lens L50. The mask M at an object side surface of the first lens L10 may be provided as a second light blocker LB2-1. In this case, an internal end portion towards the second optical axis OA2, in the mask M at the object side surface of the first lens L10, may be the second point P2.

Figure 5:
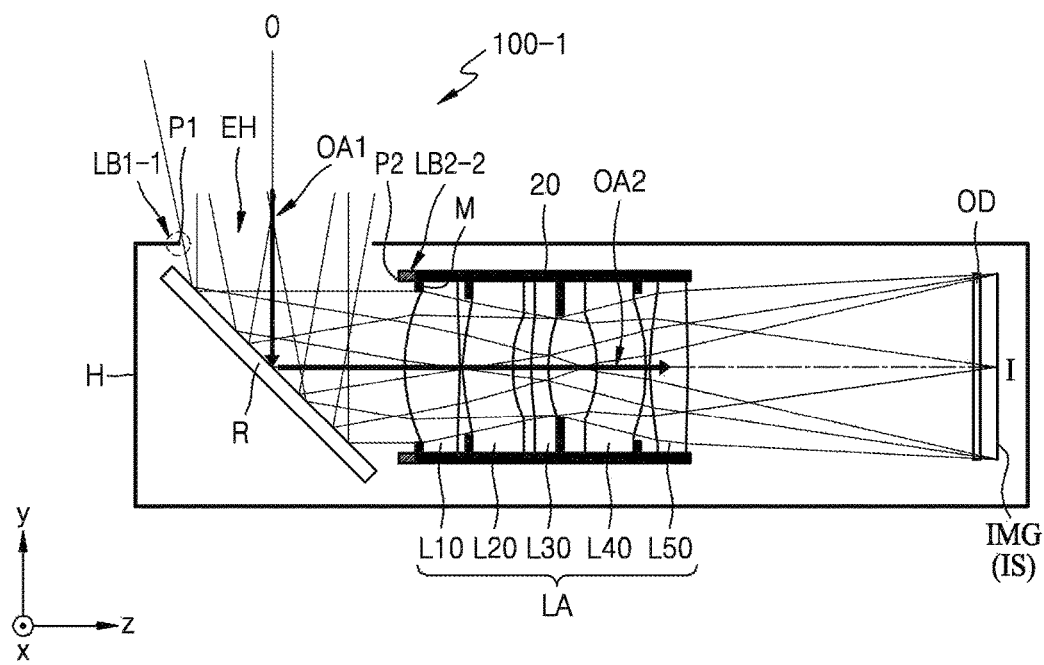
FIG. 5 is a diagram of an optical lens assembly according to an embodiment of the present disclosure.

FIG. 5 is a diagram of an optical lens assembly according to an embodiment of the present disclosure.

FIG. 5 shows an example, in which a second light blocker LB2-2 is provided at an entrance of the barrel 20 separately from the mask M of the barrel 20 in the optical lens assembly 100-1 of FIG. 4. The second light blocker LB2-2 may be provided at an object side of the barrel 20 as an independent member. Other elements are the same as those of FIG. 4, and detailed descriptions thereof are omitted.

Figure 6:
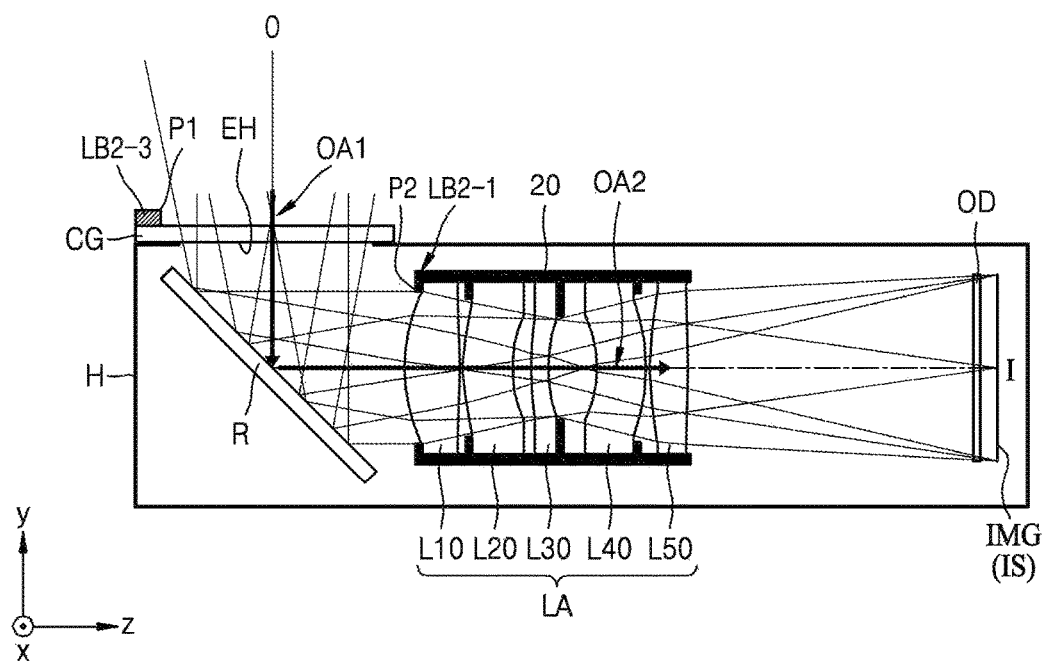
FIG. 6 is a diagram of an optical lens assembly according to an embodiment of the present disclosure.

FIG. 6 is a diagram of an optical lens assembly according to an embodiment of the present disclosure.

FIG. 6 shows an example, in which a cover glass CG is provided at the entrance hole EH and a second light blocker LB2-3 is separately provided at a side of the cover glass CG in the optical lens assembly 100-1 shown in FIG. 4.

Figure 7:
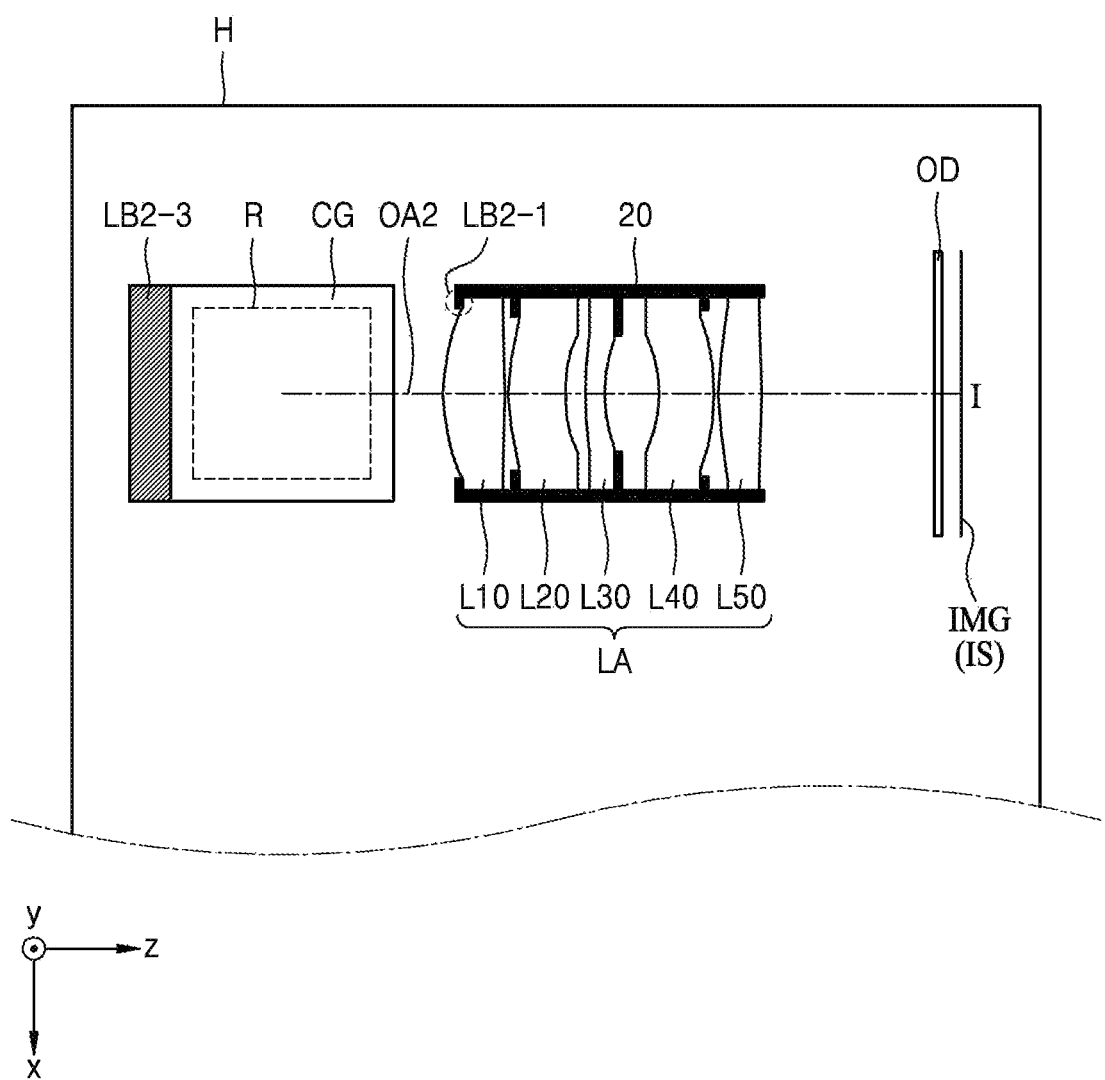
FIG. 7 is a plan view of an x-z plane of FIG. 6 according to an embodiment of the present disclosure.

FIG. 7 is a plan view of an x-z plane of FIG. 6 according to an embodiment of the present disclosure.

In this case, the second light blocker LB2-3 may be disposed only on a region where the ghost light is incident, away from the image sensor IS based on the first optical axis OA1. Otherwise, although not shown in the drawings, the second light blocker may have a square shape, an oval shape, or a circular shape similarly to the entrance hole EH. Alternatively, although not shown in the drawings, the cover glass CG may be arranged, and the second light blocker may be arranged between the cover glass CG and the case H. In other words, the first light blocker may be arranged on an external surface or an internal surface of the cover glass CG. Otherwise, the cover glass CG may be arranged, and an internal end portion of the entrance hole EH in the cover glass CG may function as the second light blocker without using an additional member.

In the optical lens assembly according to various embodiments, the shape, configuration, and structures of the first light blocker and the second light blocker are not limited provided that the first and second light blockers include the light shielding material and positions thereof block the ghost light.

The optical lens assembly according to the various embodiments may satisfy following conditions/equations.

$$LTTL/TTL<0.5 \quad \text{Equation 2}$$

$$D1/D2<0.95 \quad \text{Equation 3}$$

Here, referring to FIG. 3, LTTL denotes a distance between an object side surface of the lens closest to the object side (first lens L10) and an image side surface of the lens closest to the image side (fifth lens L50) from among the plurality of lenses in the lens array LA, TTL denotes a distance between the object side surface of the lens closest to the object side and the image sensor IS, D1 is an effective diameter of the lens closest to the object side, and D2 denotes an effective diameter of a second lens from the object side.

When conditions 2 and 3 are satisfied, diameters of the lenses in the lens array LA are reduced, and when the first and second light blockers and an aperture stop are formed, the optical lens assembly that is small in thickness may be obtained without increasing a thickness in the short side direction of the image sensor IS. In the present specification, the light blocker is an element for blocking light without regard to an F number, and the aperture stop may be an element for determining the F number.

In a small mobile device, a wide angle camera and a telephoto camera may be arranged as a dual module in order to obtain a zoom image of high resolution. However, it is difficult to miniaturize a telephoto camera module that is capable of obtaining high resolution/high magnification zoom image and being mounted in a mobile device, in a small mobile device. According to the optical lens assembly of the various embodiments, the curved-type telephoto lens system of one time-reflection type that uses a reflector may be configured thin to be mounted in a small mobile device, and the ghost light may be blocked to prevent flare.

The optical lens assembly according to the various embodiments may satisfy following condition/equation.

$$1.5<BFL/HHV<2.2 \quad \text{Equation 4}$$

Here, BFL denotes a distance from an image side surface of the lens closes to the image side (fifth lens L5) in the lens array LA to the image plane IMG, and HHV denotes an effective area size of the image sensor IS in the short side direction. When above condition 4 is satisfied, the optical lens assembly may reduce the thickness thereof in the short side direction of the image sensor IS, and may ensure a telephoto focal distance.

Figure 8:
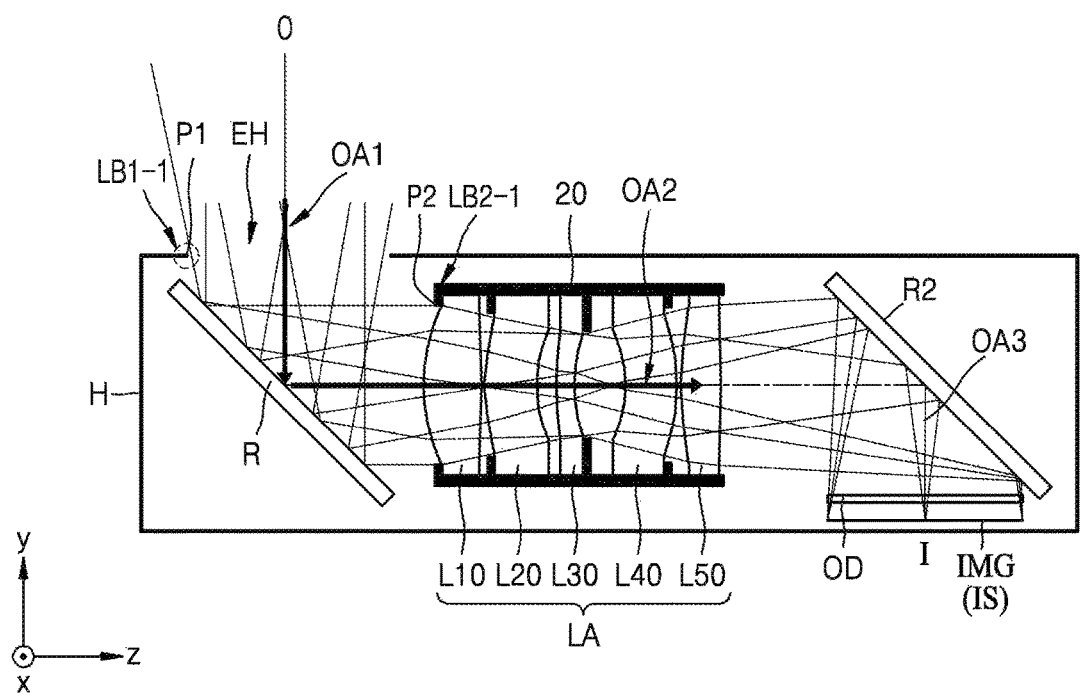
FIG. 8 is a diagram of an optical lens assembly according to an embodiment of the present disclosure.

FIG. 8 is a diagram of an optical lens assembly according to an embodiment of the present disclosure.

According to various embodiments, as shown in FIG. 8, another reflector R2 may be further arranged between the lens closest to the image side in the lens array LA and the image sensor IS. An optical path of the light that has passed through the lens array LA is changed again by the reflector R2, for example, a third optical axis OA3 may be formed. Referring to FIG. 8, the third optical axis OA3 and the first optical axis OA1 may be in parallel with each other. However, the reflector R2 may be arranged in a different direction so that the third optical axis OA3 may cross the first optical axis OA1 at a right angle, and in this case, the third optical axis OA3 may be formed in the long side direction of the image sensor IS.

The optical lens assembly according to various embodiments may have a narrow viewing angle, a reinforced telephoto performance, and a small size. The narrow viewing angle may include, for example, a viewing angle of 40° or less, and the telephoto performance may include at least some of the functions related to the telephoto lens.

The optical lens assembly according to the various embodiments may have a compact size, a telephoto performance, and high resolution. The optical lens assembly may be mounted in, for example, a mobile terminal, and may be applied to a digital camera or camcorder, a personal computer, or other electronic appliances.

The aspherical surface used in the optical lens assembly according to various embodiments may be defined as follows.

The aspherical surface shape may be defined by following condition/equation, assuming that an optical axis direction is a z-axis, a direction perpendicular to the optical axis direction is y-axis, and a proceeding direction of a light ray is positive direction. Here, z denotes a distance from a vertex of the lens along the optical axis, y denotes a distance in a direction perpendicular to the optical axis, K denotes a conic constant, A, B, C, D . . . denote aspherical coefficients, and c denotes a reciprocal number of the radius of curvature (1/R) at the vertex of the lens.

$$z = \frac{cy^2}{1+\sqrt{1-(K+1)c^2y^2}} + Ay^4 + By^6 + Cy^8 + Dy^{10} + \ldots \quad \text{Equation 5}$$

The optical lens assembly may be implemented via the numerical examples according to various designs as follows.

First Numerical Example

Figure 9:
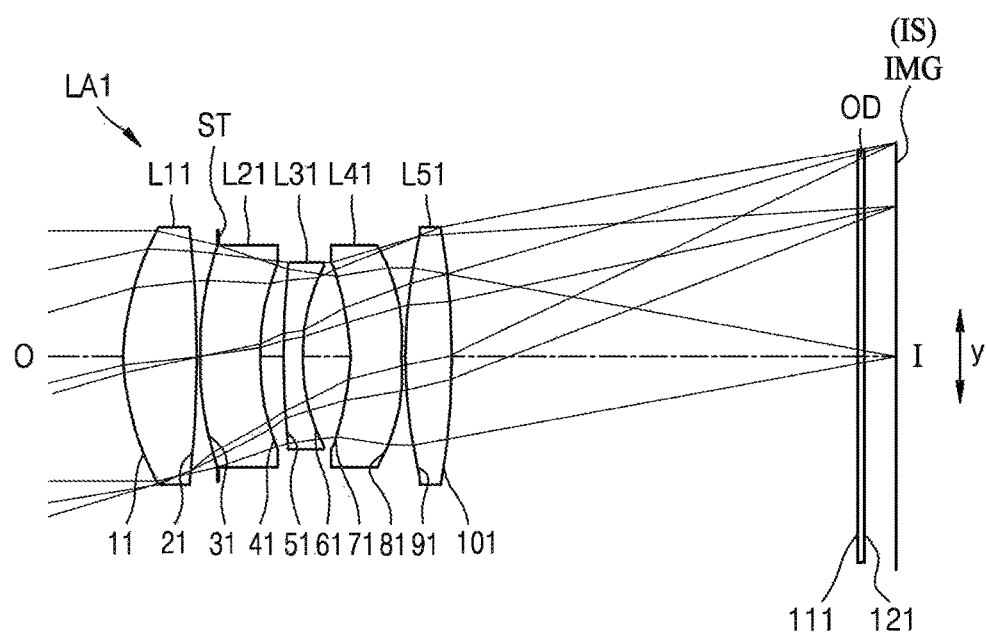
FIG. 9 is a diagram of a lens array according to a first numerical embodiment of the optical lens assembly according to an embodiment of the present disclosure.

FIG. 9 is a diagram of a lens array LAI of an optical lens assembly according to a first numerical embodiment, and table 1 illustrates lens design data according to the first numerical embodiment of the present disclosure.

In the optical lens assembly according to the first numerical embodiment, the lens array LA1 may include a first lens L11, a second lens L21, a third lens L31, a fourth lens L41, and a fifth lens L51. The first lens L11 may have a positive refractive power and, for example, may have an object side surface 11 convex towards the object side O. According to various embodiments, the first lens L11 may be a biconvex lens. The second lens L21 may have a negative refractive power. The second lens L21 may have an object side surface 31 that is convex towards, for example, the object side O. According to various embodiments, the second lens L21 may be a meniscus lens. The third lens L31 may have a negative refractive power. According to various embodiments, the third lens L31 may have an image side surface 61 that is concave towards the image side I. The third lens L31 may be, for example, a meniscus lens. The fourth lens L41 may have a negative refractive power. According to various embodiments, the fourth lens L41 may have an image side surface 81 convex towards the image side I. For example, the fourth lens L41 may be a meniscus lens. The fifth lens L51 may have a positive refractive power. The fifth lens L51 may include, for example, an object side surface 91 convex towards the object side O. The fifth lens L51 may be a biconvex lens.

According to various embodiments, the first to fifth lenses L11, L21, L31, L41, and L51 may each include a plastic lens. In the first numerical embodiment, LTTL/TTL=0.421 and D1/D2=0.863. The diameter of each of the first to fifth lenses L11, L21, L31, L41, and L51 may be less than a length of the image sensor IS in the short side direction (y direction).

The first to fifth lenses L11, L21, L31, L41, and L51 may each have at least one aspherical surface. The first to fifth lenses L11, L21, L31, L41, and L51 may each be a dual-aspherical lens. At least one optical device OD may be arranged between the fifth lens and the image sensor IS. The optical device OD may include at least one of, for example, a low pass filter, an infrared (IR)-cut filter, and a cover glass CG. For example, when the IR cut-off filter is provided as the optical device, the visible ray is transmitted and IR ray may be discharged to outside so that the IR ray may not be transferred to the image plane IMG. However, the optical lens assembly may be configured without including the optical device.

In the optical lens assembly according to various embodiments, an aperture stop ST may be provided within a smaller range than that of the short side of the image sensor IS. The aperture stop ST may be arranged at an object side of the second lens L21.

TABLE 1

| lens surface | aspherical surface | Radius of curvatur | lens thickness and lens interval | Refractive index | Abbe's number | Affective diameter |
|---|---|---|---|---|---|---|
| 11 | Asphere | 3.139 | 0.943 | 1.524700 | 56.51 | 3.28 |
| 21 | Asphere | −18.802 | 0.050 | | | |
| 31(ST) | Asphere | 4.050 | 0.777 | 1.651000 | 21.49 | 2.83 |
| 41 | Asphere | 2.774 | 0.309 | | | |
| 51 | Asphere | 9.257 | 0.250 | 1.614200 | 25.59 | |
| 61 | Asphere | 2.271 | 0.620 | | | |
| 71 | Asphere | −2.713 | 0.695 | 1.651000 | 21.49 | |
| 81 | Asphere | −2.986 | 0.050 | | | |
| 91 | Asphere | 5.366 | 0.556 | 1.524700 | 56.51 | |
| 101 | Asphere | −37.375 | 5.318 | | | 3.28 |
| 111 | Sphere | infinity | 0.110 | 1.516798 | 64.20 | |
| 121 | Sphere | infinity | 0.408 | | | |
| IMG(IS) | | | | | | |

Table 2 illustrate aspherical coefficients in the first numerical example.

TABLE 2

| lens surface | K | A | B | C | D | E | F |
|---|---|---|---|---|---|---|---|
| 11 | −6.5540E−02 | 0.0000E+00 | 9.9460E−05 | −1.5234E−04 | 0.0000E+00 | 0.0000E+00 | 0.0000E+00 |
| 21 | −5.0000E−01 | 5.5824E−03 | −3.2269E−03 | 1.1930E−03 | −2.9992E−04 | 3.2939E−05 | 0.0000E+00 |
| 31 | 2.0949E+00 | −3.1935E−03 | −4.9130E−03 | 2.4152E−03 | −6.9248E−04 | 6.8346E−05 | 0.0000E+00 |
| 41 | 1.6434E−01 | 8.0772E−03 | −1.6924E−02 | 1.6604E−02 | −7.0679E−03 | 7.7337E−04 | 0.0000E+00 |
| 51 | 1.2381E+01 | 1.2001E−02 | −4.6462E−02 | 5.0375E−02 | −2.6322E−02 | 5.0225E−03 | 2.2397E−04 |
| 61 | −9.4157E−01 | 1.2971E−02 | −4.0735E−02 | 5.6431E−02 | −4.4663E−02 | 1.9034E−02 | −3.4456E−03 |
| 71 | −5.2899E+00 | −8.8764E−03 | −3.7230E−03 | 4.3153E−03 | −7.1751E−03 | 4.8292E−03 | −1.7611E−03 |
| 81 | −2.6040E+00 | −9.5988E−03 | 4.8888E−03 | −5.5416E−03 | 2.2474E−03 | −4.1509E−04 | 0.0000E+00 |
| 91 | −4.4881E+01 | 1.2570E−02 | −8.1068E−03 | 2.3998E−03 | −3.7425E−04 | 2.5413E−05 | 0.0000E+00 |
| 101 | 5.0000E+01 | −1.1582E−02 | 2.5467E−03 | −1.4075E−03 | 3.4490E−04 | −3.3203E−05 | 0.0000E+00 |

Second Numerical Example

Figure 10:
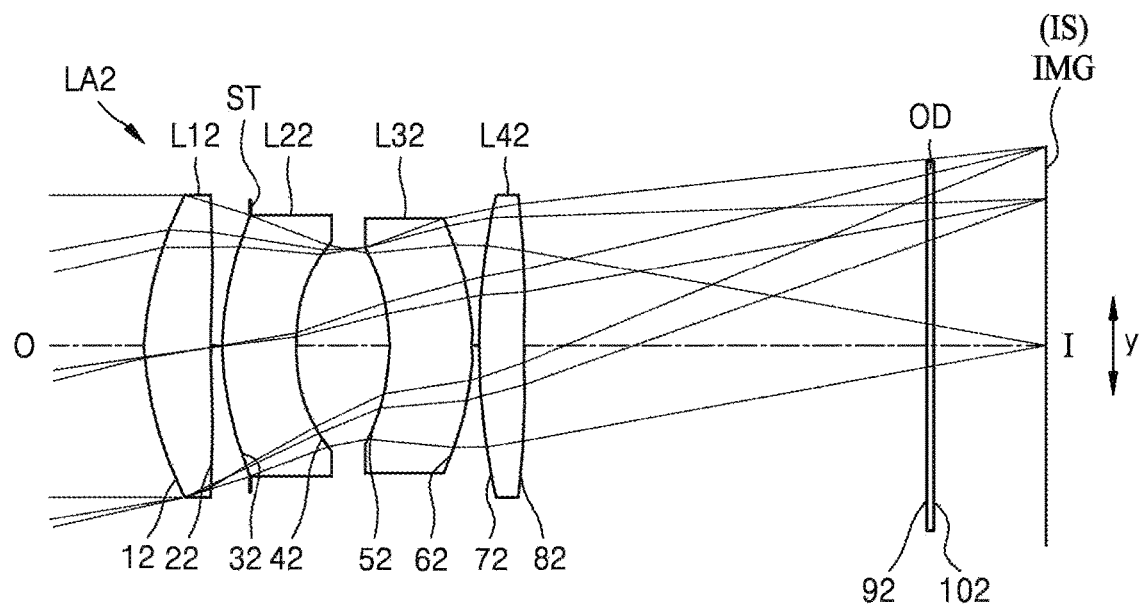
FIG. 10 is a diagram of a lens array according to a second numerical embodiment of the optical lens assembly an embodiment of the present disclosure.

FIG. 10 is a diagram of a lens array LA2 of an optical lens assembly according to a second numerical embodiment, and table 3 illustrates lens design data according to the second numerical embodiment of the present disclosure.

In the optical lens assembly according to the second numerical embodiment, the lens array LA2 may include a first lens L12, a second lens L22, a third lens L32, and a fourth lens L42. The first lens L12 may have a positive refractive power and, for example, may have an object side surface 12 convex towards the object side O. According to various embodiments, the first lens L12 may be a biconvex lens. The second lens L22 may have a negative refractive power. The second lens L22 may have an object side surface 32 that is convex towards, for example, the object side O. According to various embodiments, the second lens L22 may be a meniscus lens. The third lens L32 may have a negative refractive power. According to various embodiments, the third lens L32 may have an image side surface 52 convex towards the image side I. For example, the third lens L32 may be a meniscus lens. The fourth lens L42 may have a positive refractive power. The fourth lens L42 may include, for example, an object side surface 72 convex towards the object side O. The fourth lens L42 may be a biconvex lens. Lens surface 102 may be shaped similar to that of lens surface 121 shown in FIG. 9.

According to various embodiments, the first to fourth lenses L12, L22, L32, and L42 may each include a plastic lens. In the second numerical embodiment, LTTL/TTL=0.422 and D1/D2=0.873.

The diameter of each of the first to fourth lenses L12, L22, L32, and L42 may be less than a length of the image sensor IS in the short side direction (y direction). The first to fourth lenses L12, L22, L32, and L42 may each have at least one aspherical surface. The first to fourth lenses L12, L22, L32, and L42 may each be a dual-aspherical lens. At least one optical device OD may be arranged between the fourth lens L42 and the image sensor IS.

In the optical lens assembly according to various embodiments, an aperture stop ST may be provided within a smaller range than that of the short side of the image sensor IS. The aperture stop ST may be arranged at an object side of the second lens L22.

Third Numerical Example

Figure 11:
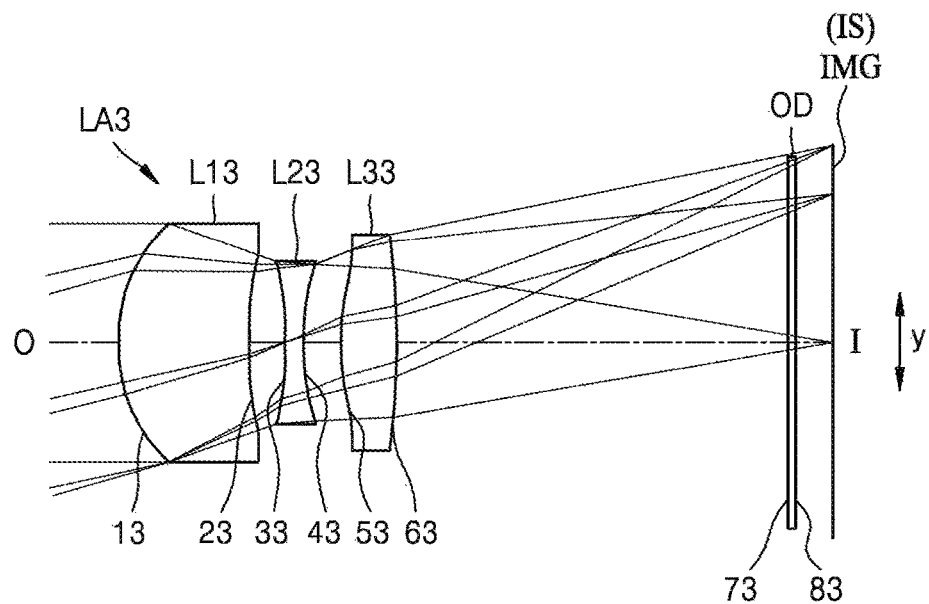
FIG. 11 is a diagram of a lens array according to a third numerical embodiment of the optical lens assembly an embodiment of the present disclosure.

FIG. 11 is a diagram of a lens array LA3 of an optical lens assembly according to a third numerical embodiment, and table 5 illustrates lens design data according to the third numerical embodiment of the present disclosure.

In the optical lens assembly according to the third numerical embodiment, the lens array LA3 may include a first lens L13, a second lens L23, and a third lens L33. The first lens L13 may have a positive refractive power and, for example, may have an object side surface 13 convex towards the object side O. According to various embodiments, the first lens L13 may be a meniscus lens. The second lens L23 may have a negative refractive power. The second lens L23 may have an object side surface 33 that is concave towards, for example, the object side O. According to various embodiments, the second lens L23 may be a biconcave lens. The third lens L33 may have a positive refractive power. The third lens L33 may include, for example, an object side surface 52 convex towards the object side O. The third lens L33 may be a biconvex lens. Lens surfaces 73 and 83 may be shaped similar to those of lens surfaces 111 and 121 (shown in FIG. 9), respectively.

According to various embodiments, the first to third lenses L13, L23, and L33 may each include a plastic lens. In the third numerical embodiment, LTTL/TTL=0.392 and D1/D2=0.682.

The diameter of each of the first to third lenses L13, L23, and L33 may be less than a length of the image sensor IS in the short side direction (y direction). The first to third lenses L13, L23, and L33 may each have at least one aspherical surface. The first to third lenses L13, L23, and L33 may each be a dual-aspherical lens. At least one optical device OD

TABLE 3

| lens surface | aspherical surface | Radius of curvature | lens thickness and lens interval | Refractive index | Abbe's number | Affective diameter |
|---|---|---|---|---|---|---|
| 12 | Asphere | 3.422 | 0.897 | 1.524700 | 56.51 | 3.925 |
| 22 | Asphere | −236.444 | 0.169 | | | |
| 32(ST) | Asphere | 4.057 | 0.955 | 1.651000 | 21.49 | 3.428 |
| 42 | Asphere | 2.093 | 1.230 | | | |
| 52 | Asphere | −2.472 | 1.111 | 1.651000 | 21.49 | |
| 62 | Asphere | −3.431 | 0.080 | | | |
| 72 | Asphere | 6.975 | 0.583 | 1.524700 | 56.51 | |
| 82 | Asphere | 136.847 | 6.478 | | | 3.925 |
| 92 | Sphere | infinity | 0.110 | 1.516798 | 64.20 | |
| IMG(IS) | Sphere | infinity | 0.300 | | | |

Table 4 illustrate aspherical coefficients in the second numerical example.

may be arranged between the third lens L33 and the image sensor IS.

TABLE 4

| lens surface | K | A | B | C | D | E | F |
|---|---|---|---|---|---|---|---|
| 12 | −2.1863E−01 | −1.5126E−04 | 1.7337E−05 | 2.2518E−06 | −1.3983E−05 | 0.0000E+00 | 0.0000E+00 |
| 22 | 5.0000E+01 | 2.8928E−03 | −1.4899E−03 | 3.9564E−04 | −7.2984E−05 | 5.3036E−06 | 0.0000E+00 |
| 32 | 1.8347E+00 | −2.3430E−03 | −2.7205E−03 | 6.8088E−04 | −1.2983E−04 | 1.0894E−05 | 0.0000E+00 |
| 42 | 4.0862E−02 | −5.6150E−04 | −7.3164E−04 | 4.9246E−03 | −1.8678E−03 | 1.3556E−04 | 9.5823E−14 |
| 52 | −4.1037E+00 | −8.8191E−03 | −7.7183E−04 | 1.5684E−03 | −1.7865E−03 | 7.6498E−04 | −1.8904E−04 |
| 62 | −3.6073E+00 | −3.1656E−03 | 2.4671E−03 | −1.6175E−03 | 4.9713E−04 | −7.1006E−05 | 0.0000E+00 |
| 72 | −4.5864E+01 | 7.7400E−04 | −1.1915E−03 | 6.7930E−04 | −8.5865E−05 | 3.8073E−06 | 0.0000E+00 |
| 82 | 5.0000E+01 | −1.2847E−02 | 2.5412E−03 | −3.6899E−04 | 8.1354E−05 | −5.5126E−06 | 0.0000E+00 |

In the optical lens assembly according to various embodiments, an aperture stop ST may be provided within a smaller range than that of the short side of the image sensor IS.

TABLE 5

| lens surface | aspherical surface | Radius of curvature | lens thickness and lens interval | Refractive index | Abbe's number | Affective diameter |
|---|---|---|---|---|---|---|
| 13 | Asphere | 2.240 | 1.700 | 1.524700 | 56.51 | 3.088 |
| 23 | Asphere | 9.852 | 0.466 | | | |
| 33(ST) | Asphere | −4.381 | 0.240 | 1.651000 | 21.49 | 2.128 |
| 43 | Asphere | 2.829 | 0.507 | | | |
| 53 | Asphere | 2.950 | 0.724 | 1.636100 | 23.90 | |
| 63 | Asphere | −33.722 | 5.241 | | | 3.088 |
| 93 | Sphere | infinity | 0.110 | 1.516798 | 64.20 | |
| IMG(IS) | Sphere | infinity | 0.300 | | | |

Table 6 illustrate aspherical coefficients in the third numerical example.

TABLE 6

| lens surface | K | A | B | C | D | E | F |
|---|---|---|---|---|---|---|---|
| 13 | 1.4045E−01 | 1.0690E−03 | −1.6901E−04 | 6.2125E−04 | −2.5354E−04 | 5.2490E−05 | 5.4370E−06 |
| 23 | 5.0000E+01 | 2.4708E−02 | −4.7557E−03 | 7.9637E−04 | 1.0386E−03 | −3.1228E−05 | 2.8231E−15 |
| 33 | 1.7596E+00 | 2.8108E−02 | −7.6013E−03 | 6.0217E−03 | −2.4941E−03 | 9.9256E−05 | 1.4621E−17 |
| 43 | 2.7964E−01 | −4.8565E−02 | 2.4855E−02 | 7.1834E−05 | −4.5555E−03 | 8.5468E−04 | 8.4442E−13 |
| 53 | −4.6331E+00 | −3.0695E−02 | −2.1292E−03 | 2.6262E−03 | −6.6715E−03 | 4.8232E−03 | −1.6658E−03 |
| 63 | 4.6074E+01 | −8.1813E−03 | −1.0007E−02 | 1.1096E−03 | 2.2660E−04 | −4.4769E−04 | −6.3355E−18 |

Fourth Numerical Example

Figure 12:
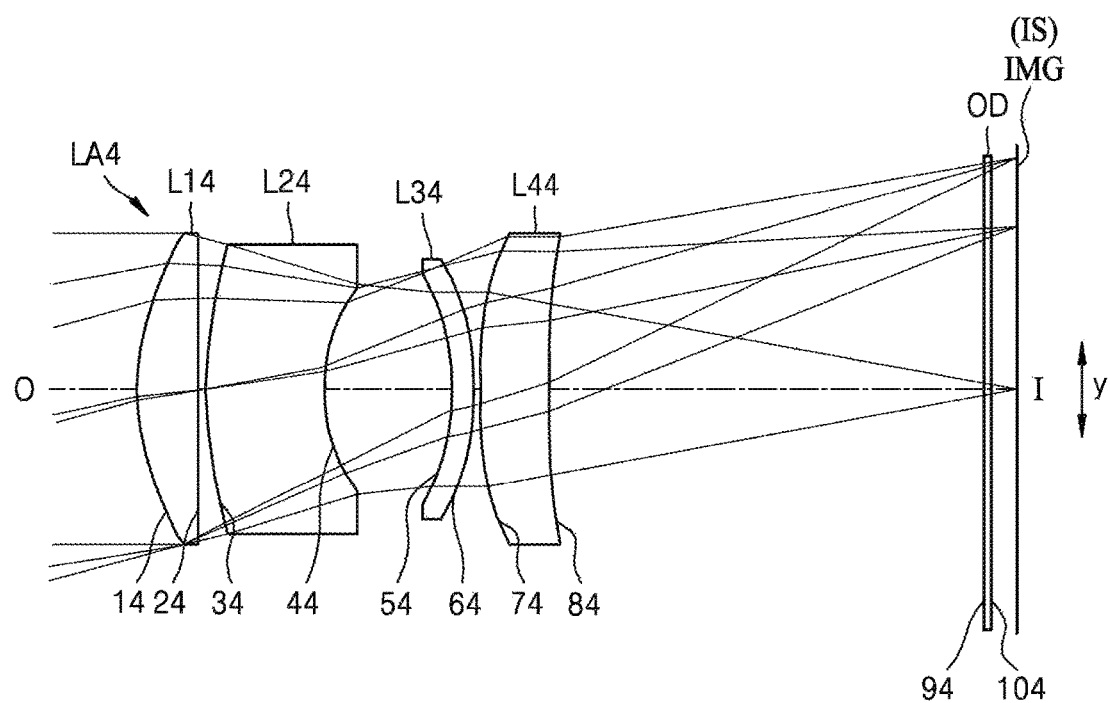
FIG. 12 is a diagram of a lens array according to a fourth numerical embodiment of the optical lens assembly an embodiment of the present disclosure.

FIG. 12 is a diagram of a lens array LA4 of an optical lens assembly according to a fourth numerical embodiment, and table 7 illustrates lens design data according to the fourth numerical embodiment of the present disclosure.

In the optical lens assembly, according to the fourth numerical embodiment, the lens array LA4 may include a first lens L14, a second lens L24, a third lens L34, and a fourth lens L44. The first lens L14 may have a positive refractive power and, for example, may have an object side surface 14 convex towards the object side O. According to various embodiments, the first lens L14 may be a meniscus lens. The second lens L24 may have a negative refractive power. The second lens L24 may have an object side surface 34 that is convex towards, for example, the object side O. According to various embodiments, the second lens L24 may be a meniscus lens. The third lens L34 may have a positive or negative refractive power. According to various embodiments, the third lens L34 may have an image side surface 54 convex towards the image side I. For example, the third lens L34 may be a meniscus lens. The fourth lens L44 may have a positive refractive power. The fourth lens L44 may include, for example, an object side surface 74 convex towards the object side O. The fourth lens L44 may be a meniscus lens. Lens surface 104 may be shaped similar to that of lens surface 121 shown in FIG. 9.

According to various embodiments, the first to fourth lenses L14, L24, L34, and L44 may each include a plastic lens. In the fourth numerical embodiment, LTTL/TTL=0.468 and D1/D2=0.924.

The diameter of each of the first to fourth lenses L12, L22, L32, and L42 may be less than a length of the image sensor IS in the short side direction (y direction). The first to fourth lenses L14, L24, L34, and L44 may each have at least one aspherical surface. The first to fourth lenses L14, L24, L34, and L44 may each be a dual-aspherical lens. At least one optical device OD may be arranged between the fourth lens L44 and the image sensor IS.

In the optical lens assembly according to various embodiments, an aperture stop ST may be provided within a smaller range than that of the short side of the image sensor IS.

TABLE 7

| lens surface | aspherical surface | Radius of curvature | lens thickness and lens interval | Refractive index | Abbe's number | Affective diameter |
|---|---|---|---|---|---|---|
| 14 | Asphere | 4.056 | 0.941 | 524700.5651 | 524700.5651 | 4.644 |
| 24 | Asphere | 108.978 | 0.064 | | | |
| 34(ST) | Asphere | 6.264 | 1.800 | 651000.2149 | 651000.2149 | 4.292 |
| 44 | Asphere | 2.356 | 1.897 | | | |
| 54 | Asphere | −4.344 | 0.407 | 651000.2149 | 651000.2149 | |
| 64 | Asphere | −3.830 | 0.049 | | | |
| 74 | Asphere | 7.668 | 1.084 | 524700.5651 | 524700.5651 | |
| 84 | Asphere | 18.851 | 6.683 | | | 4.644 |
| 94 | Sphere | infinity | 0.110 | 516798.6420 | 516798.6420 | |
| IMG(IS) | Sphere | infinity | 0.300 | | | |

Table 8 illustrate aspherical coefficients in the fourth numerical example.

TABLE 8

| lens surface | K | A | B | C | D | E | F |
|---|---|---|---|---|---|---|---|
| 14 | −2.1863E−01 | −1.7506E−04 | −4.7624E−05 | −1.3178E−05 | −6.6529E−06 | 1.9832E−07 | −7.0884E−09 |
| 24 | 5.0000E+01 | 1.4404E−03 | −7.4332E−04 | 1.1416E−04 | −1.4254E−05 | 6.7801E−07 | 7.9333E−09 |
| 34 | 1.8347E+00 | −1.3311E−03 | −8.3777E−04 | 2.2015E−04 | −2.8272E−05 | 2.3188E−06 | 0.0000E+00 |
| 44 | 4.0862E−02 | −5.8015E−03 | −1.3135E−03 | 3.9447E−04 | −2.1496E−04 | 2.0625E−05 | 1.0353E−14 |
| 54 | −4.1037E+00 | −1.5834E−05 | −2.0800E−03 | 1.7150E−04 | −3.6062E−04 | 1.1639E−04 | −2.0424E−05 |
| 64 | −3.6073E+00 | −4.1145E−03 | 7.1700E−04 | −7.0364E−04 | 8.2069E−05 | −1.1727E−05 | 0.0000E+00 |
| 74 | −4.5864E+01 | 5.5618E−03 | −4.7890E−04 | 2.2759E−04 | −1.6232E−05 | 1.0955E−06 | −6.0455E−08 |
| 84 | 5.0000E+01 | −6.8464E−03 | 9.4797E−04 | −5.0652E−05 | 1.0624E−05 | −3.9459E−07 | 1.1674E−07 |

The optical lens assembly according to various example embodiments satisfies Conditions 2 and 3 as follows. EFL denotes an effective focal distance of the optical lens assembly, Fno denotes an F number, TTL is a total length of the optical lens assembly, LTTL denotes a total length of the lens array, D1 denotes a diameter of the first lens, D2 denotes a diameter of the second lens, VHFOV denotes a half field of view with respect to the short side direction of the image sensor, and HFOV denotes a half field of view with respect to the long side direction of the image sensor.

TABLE 9

| | first embodiment | second embodiment | third embodiment | fourth embodiment |
|---|---|---|---|---|
| EFL | 9.21 | 10.87 | 9.21 | 12.9 |
| Fno | 2.847 | 2.777 | 2.983 | 1.787 |
| TTL | 10.086 | 11.912 | 9.283 | 13.333 |
| LTTL | 4.25 | 5.023 | 3.636 | 6.241 |
| D1 | 3.28 | 3.925 | 3.12 | 4.644 |
| D2 | 2.86 | 3.428 | 2.128 | 4.292 |
| LTTL/TTL | 0.421 | 0.422 | 0.392 | 0.468 |
| D2/D1 | 0.863 | 0.873 | 0.682 | 0.924 |
| VHFOV | 9.21 | 8.66 | 9.38 | 9.22 |
| HFOV | 15.02 | 14.16 | 15.34 | 15.12 |
| BFL | 5.836 | 6.889 | 5.647 | 7.092 |
| VHH | 3.00 | 3.31 | 3.04 | 4.20 |
| BFL/VHH | 1.95 | 2.08 | 1.86 | 1.69 |

For example, when the lens array LA1 of the first numerical embodiment is provided, a part of the case H is configured as the first light blocker, the second light blocker is provided separately from the barrel, and is set to be LT1D=0.800 mm and LT2D=3.8 mm in the structure as shown in FIG. 5, a value of a tan(LT1D/LT2D)×180/π=11.89, and thus, an angle formed by the first and second light blockers is greater than the HVFOV=9.21 in the first embodiment so as to prevent generation of ghost light.

The optical lens assembly according to various embodiments may be applied to, for example, an electronic device adopting an image sensor. The optical lens assembly according to an example embodiment may be applied to various electronic devices such as a digital camera, a lens replaceable camera, a video camera, a smartphone camera, a camera for small mobile devices, etc.

Figure 13:
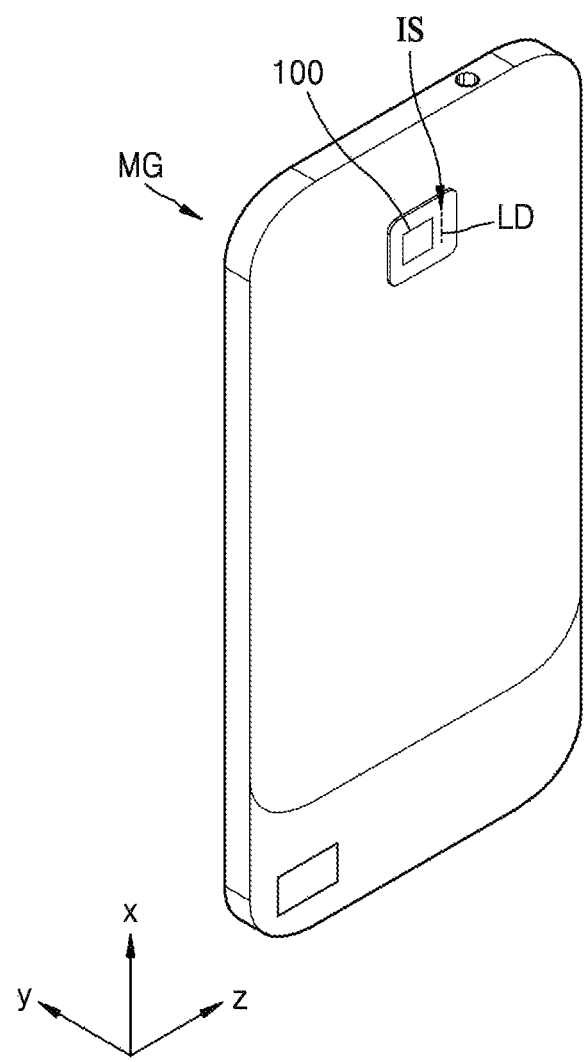
FIG. 13 is a schematic diagram of an electronic device including an optical lens assembly an embodiment of the present disclosure.

FIG. 13 is a diagram showing an example of an electronic device MG including an optical lens assembly according to an example embodiment of the present disclosure.

FIG. 13 shows an example, in which the electronic device MG is a mobile phone, but various embodiments are not limited thereto. The electronic device MG may include at least one optical lens assembly 100. The at least one optical lens assembly 100 may include the image sensor IS that receives a focused image and converts the image into an electric image signal. The optical lens assembly 100 may be one of the optical lens assemblies described above with reference to FIGS. 1 to 12. The optical lens assembly according to the various embodiments refracts the light by using the reflector and may be suitable for a thin electronic device.

The optical lens assembly 100 may be provided on a rear surface of the electronic device (e.g., smartphone), and the short side of the image sensor IS may be arranged in a smaller thickness direction of the electronic device. Referring to FIG. 13, the long side LD of the image sensor IS may be arranged on the rear surface of the electronic device MG in a longitudinal direction.

Since all of the lenses in the lens array LA of the optical lens assembly 100 according to various embodiments have effective diameters that are less than the short side length of the image sensor IS, the optical lens assembly 100 may be applied appropriately to the thin electronic device MG.

Figure 14:
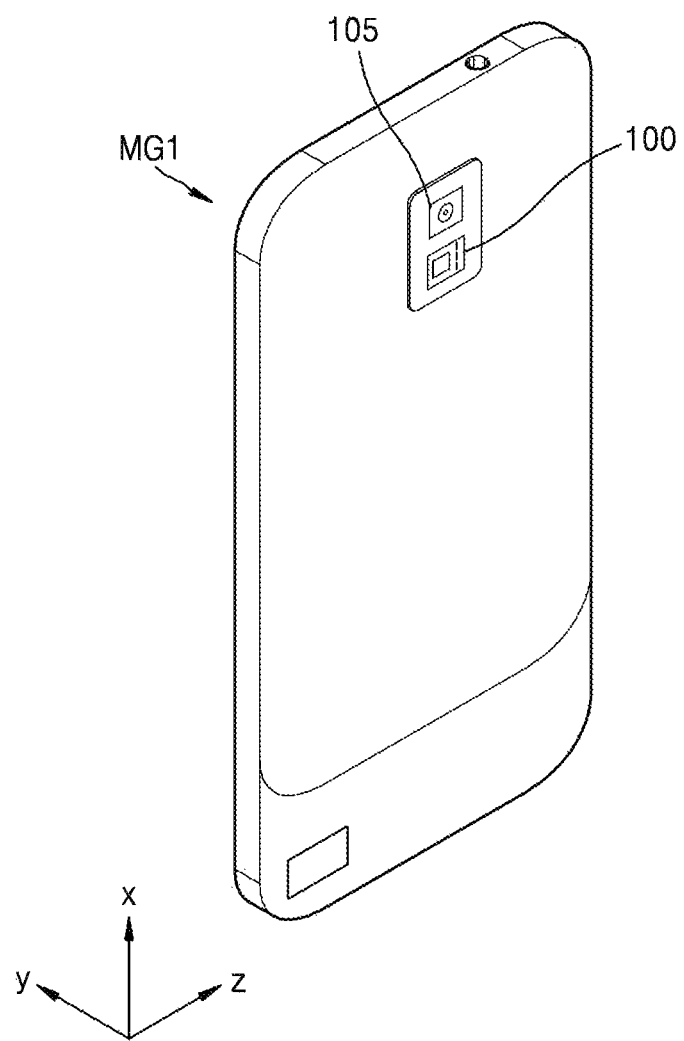
FIG. 14 is a diagram of an electronic device including two optical lens assemblies according to an embodiment of the present disclosure.

FIG. 14 is a diagram of an electronic device including two optical lens assemblies according to an embodiment of the present disclosure.

An electronic device MG1 shown in FIG. 14 may include the optical lens assembly 100 and another optical lens assembly 105. For example, the optical lens assembly 100 and the optical lens assembly 105 may have different viewing angles or different focal distances from each other. For example, the optical lens assembly 100 may be a telephoto lens system, and the optical lens assembly 105 may be a standard lens system. Otherwise, the optical lens assembly 100 may be a telephoto lens system, and the optical lens assembly 105 may be a wide angle lens system. For example, the optical lens assembly 100 may have a view angle of 40° or less. As described above, the electronic device MG1 may include a plurality of optical lens assemblies, and may capture images by selectively using the plurality of optical lens assemblies. Otherwise, images captured by the optical lens assembly 100 and the optical lens assembly 105 may be synthesized to generate an image having a viewing angle (focal distance) existing between the viewing angle (or focal distance) of the optical lens assembly 100 and the viewing angle (or focal distance) of the optical lens assembly 105. Digital zoom may be implemented through the above image synthesizing process. Therefore, a zooming effect may be obtained by using the optical lens assembly 100 of the small size and the optical lens assembly 105. According to various embodiments, the optical lens assembly 100 and the optical lens assembly 105 may have a zoom magnification of 2.5 to 5 times. The optical lens assembly according to various embodiments may arrange multiple small lens modules in order to obtain a zoom image of high resolution and high magnification in a small mobile device, and thus, an effect of a linear optical zoom may be actually obtained. For example, a wide lens module and a telephoto lens module according to various embodiments are arranged, and a wide angle image and a telephoto image are captured and synthesized to generate an image having an intermediate magnification between the wide angle and the telephoto images without degrading image quality. Thus, a zooming effect between a wide angle end and a telephoto end may be obtained, and since a multi-module is used, the thin optical system may be obtained when compared with the optical system using an actual optical zoom lens and a digital zoom image of high magnification may be provided.

In a case where a plurality of camera modules having different viewing angles are arranged in a mobile device, differences in, for example, blurring due to defocusing, relative illumination, white balance, processing of connecting portion between images, etc., caused when images having different viewing angles are synthesized need to be reduced. In order to process the portion where the images having different viewing angles are connected to each other, arrangement of the multi-module cameras and the image sensor is important.

For example, based on the wide camera module, a telephoto camera module having a maximum zoom magnification may be arranged, and if necessary, a middle camera module between the wide angle end and the telephoto end may be arranged to obtain high image quality and high magnification zoom images.

As described above, the same effect as the linear optical zoom may be obtained by using the multi-module. When the zooming effect is obtained by using the multi-module, the thinner lens system when comparing with that using one module to obtain the zoom effect may be provided.

Figure 15:
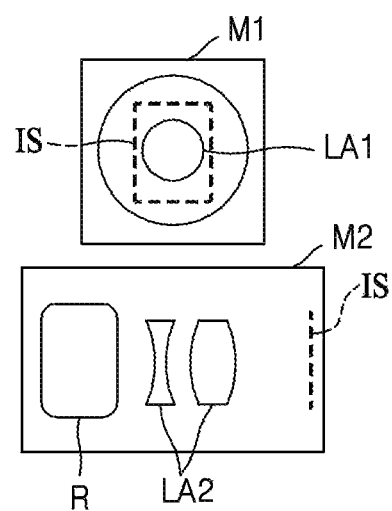
FIG. 15 is a diagram of a structure, in which optical lens assemblies are arranged as a multi-module according to an embodiment of the present disclosure.

FIG. 15 is a diagram of a structure, in which optical lens assemblies are arranged as a multi-module of the present disclosure according to an embodiment of the present disclosure.

FIG. 15 illustrates an example, in which a first optical lens assembly M1 and a second optical lens assembly M2 are provided. The first optical lens assembly M1 and the second optical lens assembly M2 may be arranged adjacent to an electronic device. For example, the first optical lens assembly M1 may include a wide angle lens system, and the second optical lens assembly M2 may include a telephoto lens system. The first optical lens assembly M1 may include a first lens array LA1 and a first image sensor IS1. The second optical lens assembly M2 may include a reflector R, a second lens array LA2, and a second image sensor IS2. Lenses in the first lens array LA1 are arranged in a direction perpendicular to the ground in the drawing, and lenses in the second lens array LA2 may be arranged in a transverse direction in the drawing. An image captured by the first optical lens assembly M1 and an image captured by the second optical lens assembly M2 may be synthesized to obtain a combined image of an intermediate magnification. For example, when the first optical lens assembly M1 has a first viewing angle and the second optical lens assembly M2 has a second viewing angle, the image captured by the first optical lens assembly M1 and the image captured by the second optical lens assembly M2 are synthesized to generate an image having a third viewing angle between the first viewing angle and the second viewing angle, and thus, a zoom image may be obtained. The image captured by the second optical lens assembly M2 is determined by a location of the reflector R to which the light is firstly incident, and thus, the location of the reflector R is important. In addition, the ghost light that may occur in a structure where the light is directly incident to the reflector R and refracted without passing through the lens by using the first and second light blockers described above with reference to FIGS. 1 to 8.

Figure 16:
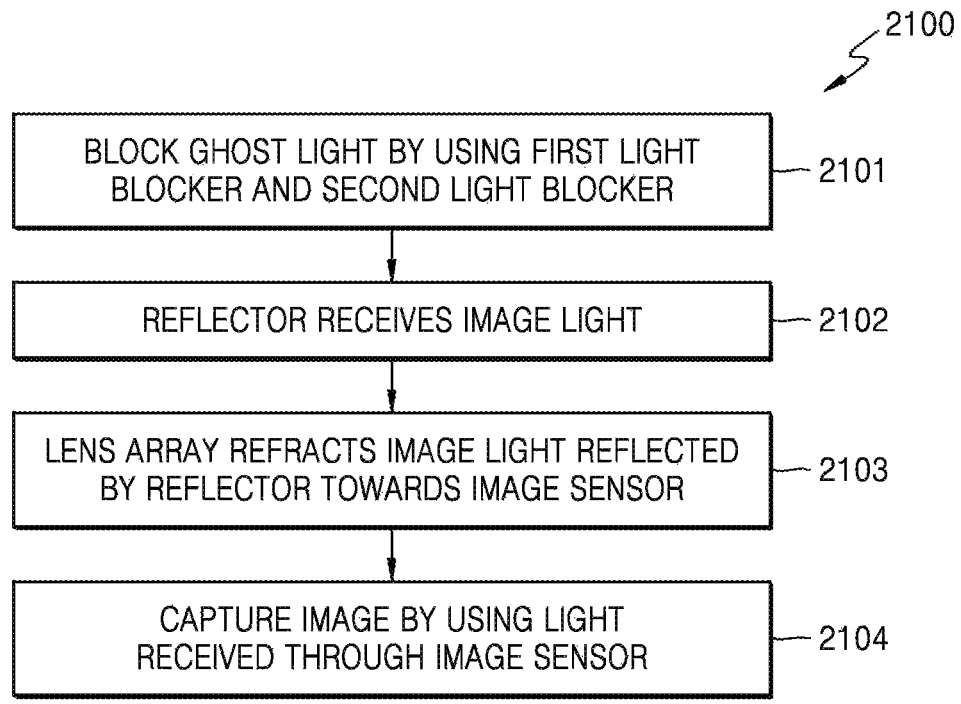
FIG. 16 is a high-level flowchart of a method of performing an image capturing by using an optical lens assembly in an electronic device according to an embodiment of the present disclosure.

FIG. 16 is a high-level flowchart 2100 of a method of performing an image capturing by using the optical lens assembly illustrated in FIGS. 1 to 15, in the electronic device according to an embodiment of the present disclosure.

According to an embodiment, in operation 2101, the first light blocker and the second light blocker of the optical lens assembly may block the ghost light.

In operation 2102, the reflector of the optical lens assembly according to various embodiments may receive image light.

In operation 2103, for example, the lens array included in the optical lens assembly may refract the light reflected by the reflector towards the image sensor.

Figure 18:
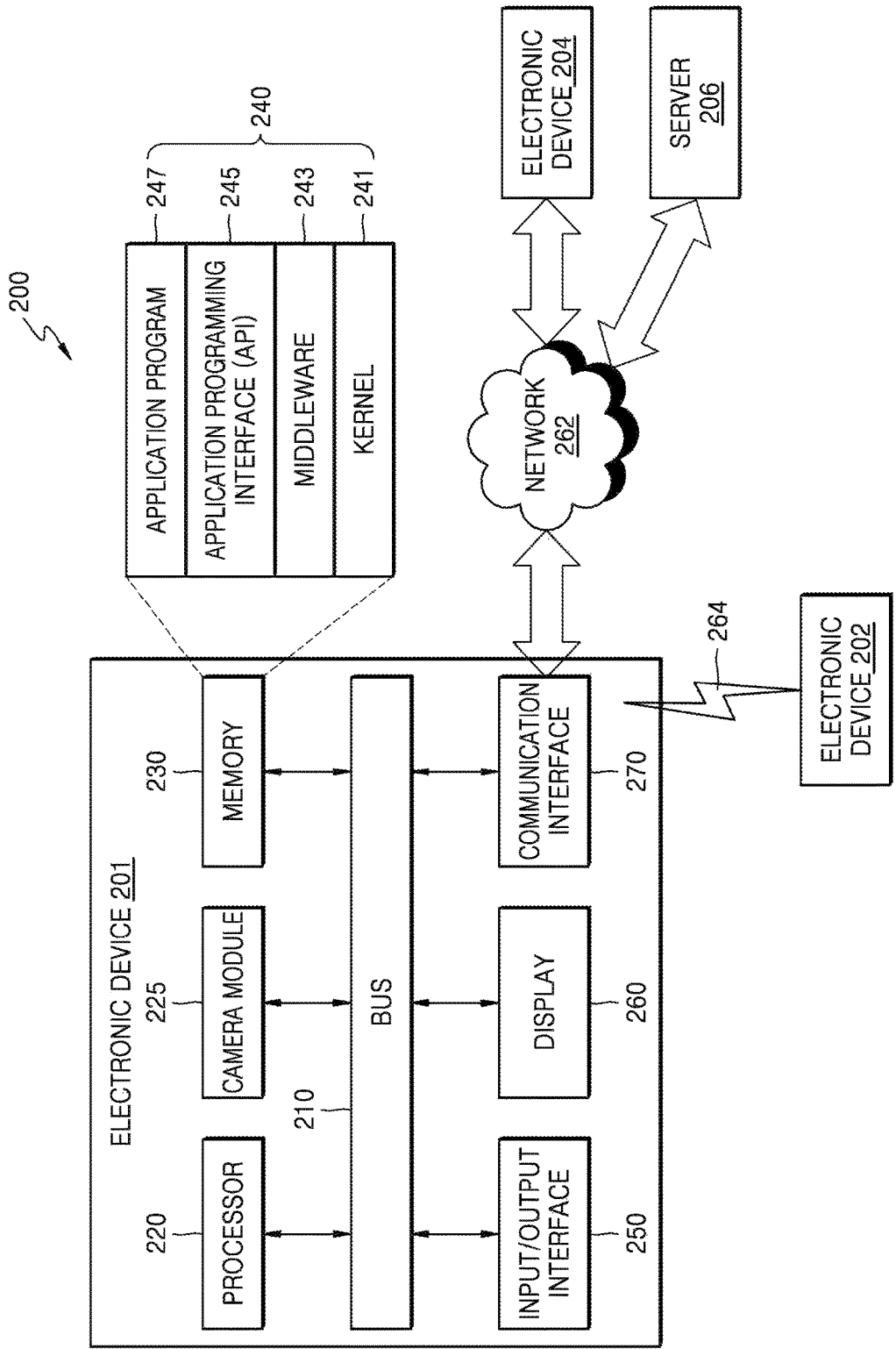
FIG. 18 is a diagram of a network environment system according to various embodiments of the present disclosure.
Figure 19:
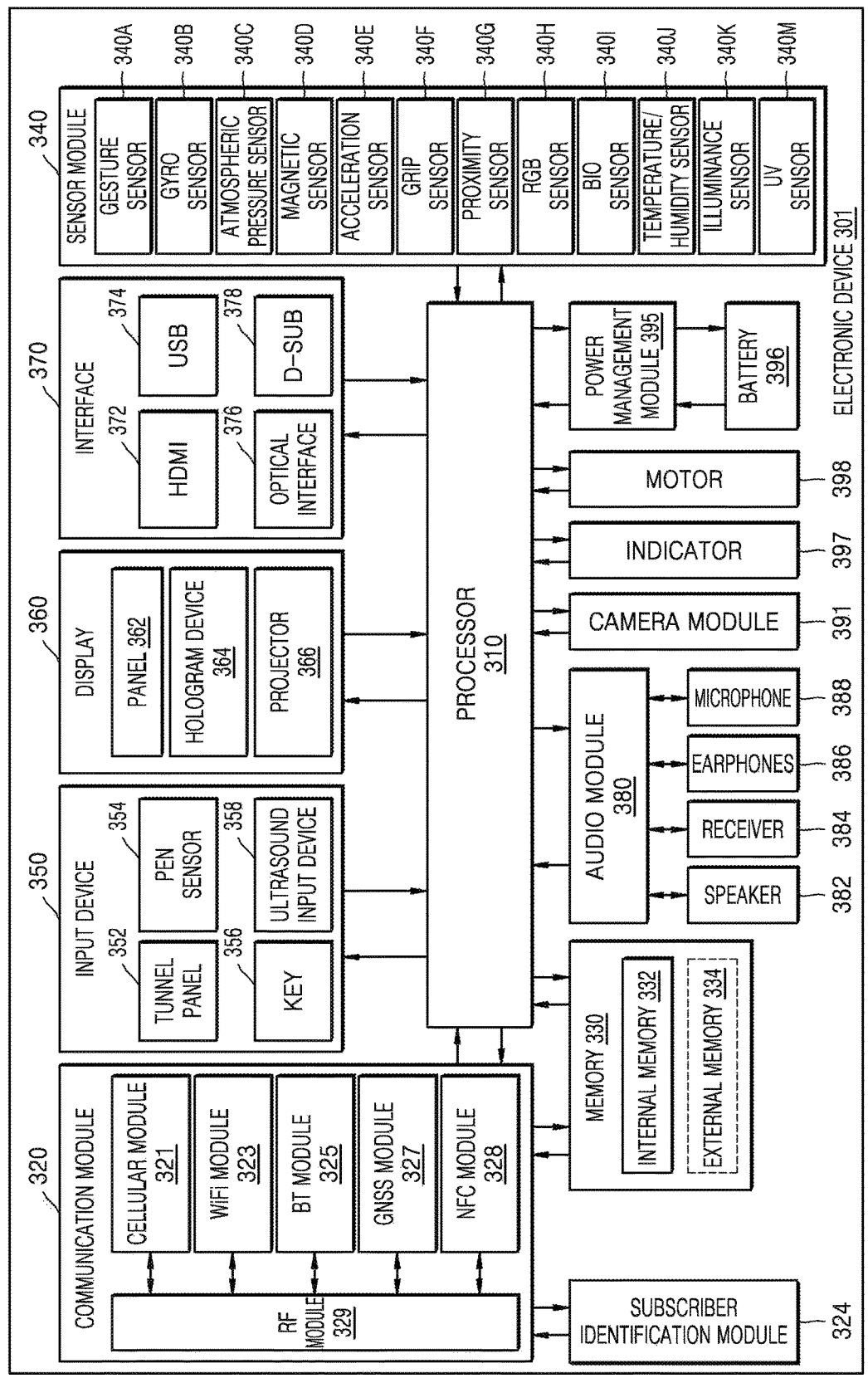
FIG. 19 is a block diagram of an electronic apparatus according to various embodiments of the present disclosure.

In operation 2104, for example, an image may be captured by using an image sensor (not shown) constituting at least a part of the camera module (e.g., a camera module 225 of FIG. 18 or a camera module 391 of FIG. 19) included in the electronic device (e.g., an electronic device 201 of FIG. 18 or an electronic device 301 of FIG. 19).

Figure 17:
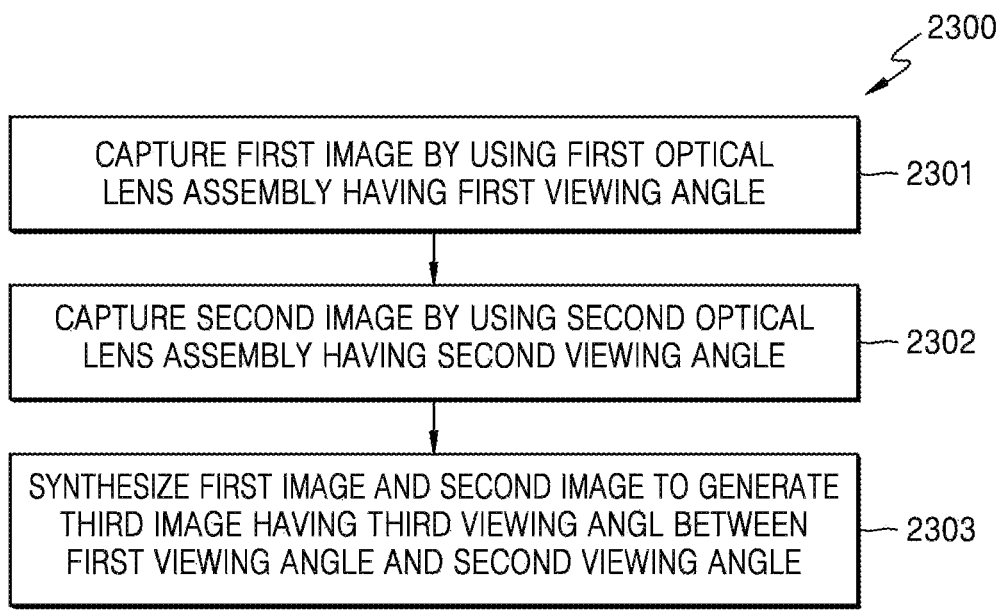
FIG. 17 is a high-level flowchart of a method of performing an image capturing by using two optical lens assemblies in an electronic device according to an embodiment of the present disclosure.

FIG. 17 is a high-level flowchart 2300 of a method of performing image capturing by using a multi-module in an electronic device according to an embodiment of the present disclosure.

According to an embodiment, in operation 2301, a first image is captured by a first optical lens assembly having a first viewing angle. The first optical lens assembly may be, for example, a wide angle lens system.

In operation 2302, for example, a second image is captured by a second optical lens assembly having a second viewing angle. The second optical lens assembly may be, for example, a telephoto lens system according to various embodiments.

In operation 2303, for example, the first image and the second image may be synthesized to generate a third image having a third viewing angle between the first viewing angle and the second viewing angle. As such, a digital zoom effect may be obtained within a range between the first viewing angle and the second viewing angle.

FIG. 18 is a diagram of a network environment system according to various embodiments of the present disclosure.

An electronic device 201 in a network environment 200 according to various embodiments will be described below with reference to FIG. 18. The electronic device 201 may include a bus 110, a processor 220, a camera module 225, a memory 230, an input/output interface 250, a display 260, and a communication interface 270. In some embodiments, the electronic device 201 may omit at least one of the components, or may further include an additional component.

The bus 210 may include, for example, a circuit connecting the components (210 to 270) to one another and transmitting communication (e.g., a control message and/or data) among the components.

The processor 220 may include at least one of a central processing unit (CPU), an application processor (AP), and a communication processor (CP). The processor 220 may execute, for example, calculations or data processing about controlling and/or communicating among at least one another component in the electronic device 201.

The camera module 225 is, for example, a device capable of capturing still images and videos, and according to an example embodiment, the camera module 225 may include one or more image sensors (e.g., a front sensor or a rear sensor), a lens, an image signal processor (ISP), or a flash (e.g., a light emitting diode (LED), a xenon lamp, etc.) For example, the optical lens assembly according to various embodiments may be applied to the camera module 225.

The memory 230 may include a volatile and/or non-volatile memory. The memory 230 may store, for example, commands or data regarding at least one another component in the electronic device 201. According to one example embodiment, the memory 230 may store software and/or a program 240. The program 240 may include, for example, a kernel 241, middleware 243, an application programming interface (API) 245, and/or an application program (or "application") 247, etc. At least some of the kernel 241, the middleware 243, or the API 245 may be referred to as an operating system (OS).

The kernel 241 may control or manage system resources (e.g., the bus 210, the processor 220, the memory 230, etc.) used to execute operations or functions implemented in other programs (e.g., the middleware 243, the API 245, or the application program 247). Also, the kernel 241 may provide an interface capable of controlling or managing the system resources, by accessing individual component of the electronic device 201 from the middleware 243, the API 245, or the application program 247.

The middleware 243 may perform mediation function so that, for example, the API 245 or the application program 247 may communicate with the kernel 241 and exchange data.

In addition, the middleware 243 may process one or more operation requests transmitted from the application program 247 according to a priority order. For example, the middleware 143 may grant to at least one of the application program 247 a priority order of using the system resources (e.g., the bus 210, the processor 220, or the memory 230) of the electronic device 201. For example, the middleware 243 processes the one or more operation requests according to the priority order granted to the at least one application program 247, thereby performing scheduling or load balancing of the one or more operation requests.

The API 245 is, for example, an interface for the application 247 to control the functions provided by the kernel 241 or the middleware 243, and may include at least one interface or function (e.g., command), for example, for file control, window control, image processing, or text control.

The input/output interface 250 may function as, for example, an interface capable of transmitting command or data input from the user or another external device to the other component(s) of the electronic device 201. In addition, the input/output interface 250 may output command or data transmitted from the other component(s) of the electronic device 201 to the user or another external device.

The display 260 may include, for example, a liquid crystal display (LCD), a light-emitting diode (LED) display, an organic LED (OLED) display, a microelectromechanical systems (MEMS) display, or an electronic paper display. The display 260 may display, for example, various pieces of content (e.g., text, images, videos, icons, or symbols) to the user. The display 260 may include a touch screen, and may receive, for example, a touch input, a gesture input, a proximity input, or a hovering input via an electronic pen or a part of a body of the user.

The communication interface 270 may set communications between, for example, the electronic device 201 and an external device (e.g., a first external electronic device 202, a second external electronic device 204, or a server 206). For example, the communication interface 270 is connected to a network 262 via wireless communication or wires communication to communicate with an external device (e.g., the second external electronic device 204 or the server 206).

The wireless communication may use a cellular communication protocol, for example, at least one of long-term evolution (LTE), LTE-advance (LTE-A), code division multiple access (CDMA), wideband CDMA (WCDMA), universal mobile telecommunications system (UNITS), wireless broadband (WiBro), and global system for mobile communications (GSM). Also, the wireless communication may include, for example, near distance communication 264. The near distance communication 264 may include, for example, at least one of wireless fidelity (WiFi), Bluetooth, near field communication (NFC), and global navigation satellite system (GNSS). GNSS may include, for example, at least one of global positioning system (GPS), global navigation satellite system (Glonass), Beidou navigation satellite system (Beidou) or Galileo, and the European global satellite-based navigation system, according to used region or bandwidth. Hereinafter, in the present specification, GPS and GNSS may be interchangeably used. The wires communication may include, for example, at least one of universal serial bus (USB), high definition multimedia interface (HDMI), recommended standard-232 (RS-232), and plain old telephone service (POTS). The network 262 may include telecommunications network, for example, at least one of computer network (e.g., local area network (LAN) or wide area network (WAN)), Internet, and telephone network.

The first and second external electronic devices 202 and 204 may each be a device of the same kind as or different from the electronic device 201. According to one embodiment, the server 206 may include a group of one or more servers. According to various embodiments, all or some of operations performed in the electronic device 201 may be executed in one or more other electronic devices (e.g., the electronic devices 202 and 204), or the server 206. According to one example embodiment, in a case where the electronic device 201 has to perform a certain function or service automatically or upon request, the electronic device 201 may request another device (e.g., the electronic devices 202 and 204, or the server 206) to perform at least some functions related to the certain function or service, instead of or additionally to the executing of the certain function or service on its own. The electronic device (e.g., the electronic device 202 and 204, or the server 206) may execute requested function or the additional function, and may transfer a result of execution to the electronic device 201. The electronic device 201 may provide requested function or service after processing or without processing the result. To do this, for example, a cloud computing, a distributed computing, or a client-server computing technique.

FIG. 19 is a block diagram of an electronic device 301 according to various embodiments of the present disclosure. The electronic device 301 may include, for example, whole or some parts of the electronic device 201 illustrated in FIG. 18. The electronic device 301 may include one or more processors (e.g., an application processor (AP)) 310, a communication module 320 (a subscriber identification module 324), a memory 330, a sensor module 340, an input device 350, a display 360, an interface 370, an audio module 380, a camera module 391, a power management module 395, a battery 396, an indicator 397, and a motor 398.

The processor 310 may drive, for example, an operating system (OS) or an application program to control a plurality of hardware or software components connected to the processor 310, and may perform various data processing and calculation. The processor 310 may be implemented as, for example, a system on chip (SOC). According to one example embodiment, the processor 310 may further include a graphic processing unit (GPU) and/or an image signal processor (ISP). The processor 310 may include at least some (e.g., a cellular module 321) of the components illustrated in FIG. 19. The processor 310 may load the command or data transmitted from at least one of the other components (e.g., non-volatile memory) on a volatile memory to process the command or data, and may store various data in the non-volatile memory.

The communication module 320 may have a structure that is the same as or similar to that of the communication interface 270 of FIG. 18. The communication module 320 may include, for example, a cellular module 321, a WiFi module 323, a Bluetooth (BT) module 325, a GNSS module 327 (e.g., a GPS module, a Glonass module, a Beidou module, or a Galileo module), an NFC module 328, and a radio frequency (RF) module 329.

The cellular module 321 may provide, for example, voice call service, video call service, text message service, or Internet service via a communication network. According to one example embodiment, the cellular module 321 may perform discrimination and authentication of the electronic device 301 within the communication network by using the subscriber identification module (e.g., a SIM card) 324. According to one example embodiment, the cellular module 321 may perform at least some of the functions that may be provided by the processor 310. According to one example embodiment, the cellular module 321 may include a communication processor (CP).

Each of the WiFi module 323, the Bluetooth module 325, the GNSS module 327, and the NFC module 328 may include a processor for processing data transmitted/received through the corresponding module. According to one example embodiment, at least some (e.g., two or more) of the cellular module 321, the WiFi module 323, the Bluetooth module 325, the GNSS module 327, and the NFC module 328 may be included in one integrated chip (IC) or an IC package.

The RF module 329 may transmit/receive, for example, a communication signal (e.g., an RF signal). The RF module 329 may include, for example, a transceiver, a power amp module (PAM), a frequency filter, a low noise amplifier (LNA), or an antenna. According to another example embodiment, at least one of the cellular module 321, the WiFi module 323, the Bluetooth module 325, the GNSS module 327, and the NFC module 328 may transmit/receive an RF signal via an additional RF module.

The subscriber identification module 324 may include, for example, a card including the subscriber identification module and/or an embedded SIM, and may include unique identification information (e.g., integrated circuit card identifier (ICCID)) or subscriber information (e.g., international mobile subscriber identity (IMSI)).

The memory 330 may include, for example, an internal memory 332 or an external memory 334. The internal memory 332 may include, for example, at least one of a volatile memory (e.g., dynamic random access memory (DRAM), static RAM (SRAM), synchronous dynamic RAM (SDRAM), etc.), a non-volatile memory (e.g., one time programmable read-only memory (OTPROM), programmable ROM (PROM), an erasable and programmable ROM (EPROM), an electrically erasable and programmable ROM (EEPROM), a mask ROM, a flash ROM, a flash memory (e.g., NAND flash, NOR flash, etc.), hard drive, or solid state drive (SSD).

The external memory 334 may further include a flash drive, for example, a compact flash (CF), secure digital (SD), micro-SD, Mini-SD, extreme digital (xD), a multi-media card (MMC), a memory stick, etc. The external memory 334 may be functionally and/or physically connected to the electronic device 301 via various interfaces.

The sensor module 340 may measure a physical amount or sense an operating state of the electronic device 301, so as to convert measured or sensed information into an electric signal. The sensor module 340 may include, for example, at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a red, green, blue (RGB) sensor), a bio sensor 340I, a temperature/humidity sensor 340J, an illuminance sensor 340K, and an ultra violet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may include a control circuit for controlling at least one sensor included therein. In some embodiments, the electronic device 301 may further include a processor configured to control the sensor module 340 as a part of the processor 310 or separately, so as to control the sensor module 340 while the processor 310 is in a sleep state.

The input device 350 may include, for example, a touch panel 352, a (digital) pen sensor 354, a key 356, or an ultrasonic input device 358. The touch panel 352 may use at least one of, for example, a capacitive type, a pressure sensitive type, an IR type, and an ultrasound type touch screen. Also, the touch panel 352 may further include a control circuit. The touch panel 352 may further include a tactile layer to provide a user with a tactile reaction.

The (digital) pen sensor 354 may be, for example, a part of the touch panel 352, or may include an additional recognition sheet. The key 356 may include, for example, a physical button, an optical key, or a keypad. The ultrasound input device 358 may sense ultrasound wave generated from an input device via a microphone (e.g., a microphone 388) to identify data corresponding to the ultrasound wave.

The display 360 (e.g., the display 360) may include a panel 362, a hologram device 364, or a projector 366. The panel 362 may have a structure that is the same as or similar to that of the display 260 shown in FIG. 18. The panel 362 may be configured to be, for example, flexible, transparent, or wearable. The panel 362 may be configured as one module with the touch panel 352. According to one example embodiment, the panel 362 may include a pressure sensor (or a force sensor) capable of measuring an intensity of a pressure from a touch of the user. The pressure sensor may be provided integrally with the touch panel 352, or may be provided as one or more additional sensors separately from the touch panel 352. The hologram device 364 may show a stereoscopic image in the air by using interference of light. The projector 366 may display images by projecting light onto a screen. The screen may be located, for example, inside or outside the electronic device 301. According to one example embodiment, the display 360 may further include a control circuit for controlling the panel 362, the hologram device 364, or the projector 366.

The interface 370 may include, for example, an HDMI 372, a universal serial bus (USB) 374, an optical interface 376, or a D-subminiature (D-sub) 378. The interface 370 may be included, for example, in the communication interface 370 shown in FIG. 19. Additionally or alternatively, the interface 370 may include, for example, a mobile high-definition link (MHL) interface, a secure digital (SD) card/multi-media card (MMC) interface, or infrared data association (IrDA) standard interface.

The audio module 380 may bi-directionally convert sound and electric signals to each other. At least some of components of the audio module 380 may be included in, for example, an input/output interface 245 shown in FIG. 18. The audio module 380 may process sound information input or output through, for example, a speaker 382, a receiver 384, earphones 386, or a microphone 388.

The camera module 391 is, for example, a device capable of capturing still images and videos, and according to an example embodiment, the camera module 225 may include one or more image sensors (e.g., a front sensor or a rear sensor), a lens, an image signal processor (ISP), or a flash (e.g., a light emitting diode (LED), a xenon lamp, etc.) For example, the optical lens assembly according to various embodiments may be applied to the camera module 391.

The power management module 395 may manage power of the electronic device 301. The electronic device 301 may be an electronic device receiving power supply from a battery, but is not limited thereto. According to one example embodiment, the power management module 395 may include a power management integrated circuit (PMIC), a charger IC, or a battery or fuel gauge. The PMIC may be charged through wires and/or wirelessly. The wireless charging method may include, for example, a magnetic resonance method, a magnetic induction method, or an electromagnetic wave method, and an additional circuit for wireless charging, for example, a coil loop, a resonant circuit, or a rectifier may be further provided. The battery gauge may measure, for example, a remaining capacity of the battery 396, a voltage, a current, or a temperature during the charging. The battery 396 may include, for example, a rechargeable battery and/or a solar battery.

The indicator 397 may display a certain state of the electronic device 301 or a part of the electronic device 301 (e.g., the processor 310), for example, a booting state, a message state, or a charging state. The motor 398 may convert an electric signal into mechanical vibration, and may generate vibration effect or haptic effect. Although not shown in the drawing, the electronic device 301 may include a processing device (e.g., GPU) for supporting mobile TV function. The processing device for supporting the mobile TV may process media data according to standard such as digital multimedia broadcasting (DMB), digital video broadcasting (DVB), or mediaFlo™.

The optical lens assembly according to various embodiments, the optical lens assembly focusing an image of an object on the image sensor, includes a reflector configured to reflect incident light; a lens array including a plurality of lenses arranged between the reflector and the image sensor; a first light blocker arranged at an object side of the reflector to block the light; and a second light blocker arranged at an image side of the reflector to block the light, wherein the optical lens assembly includes a first optical axis of the light proceeding towards the reflector and a second optical axis of the light reflected by the reflector, and satisfies a condition/equation below.

$$a\tan(LT1D/LT2D) \times 180/\pi > VHFOV \quad \text{Equation 1}$$

Here, assuming that a point where a first straight line extending from a first point of the first light blocker towards the first optical axis, wherein the first point is away from the image sensor based on the first optical axis on a cross-section of the optical lens assembly taken along the short side direction of the image sensor, in parallel with the first optical axis and a second straight line extending from a second point of the second light blocker towards the second optical axis, wherein the second point is adjacent to the first point based on the second optical axis, in parallel with the second optical axis meet each other is a point D, LT1D denotes a distance from the first point to the point D, LT2D denotes a distance from the second point to the point D, and VHFOV denotes a half field of view in the short side direction of the image sensor.

The reflector may include, for example, a reflective mirror or a prism.

For example, a lens may not be arranged at an object side of the reflector.

For example, the lens array may include three or more lenses.

For example, the lens array may include a first lens having a positive refractive power, a second lens having a negative refractive power, and a third lens having a positive refractive power.

For example, the lens array may include a fourth lens having a positive refractive power, a fifth lens having a negative refractive power, a sixth lens having a meniscus shape concave towards the object side, and a seventh lens having a positive refractive power.

For example, the lens array may further include an eighth lens having a negative refractive power between the fifth lens and the sixth lens.

For example, the optical lens assembly may satisfy following conditions/equations.

$$LTTL/TTL < 0.5 \quad \text{Equation 2}$$

$$D1/D2 < 0.95 \quad \text{Equation 3}$$

Here, LTTL denotes a distance from an object side surface of a lens closest to the object side from among a plurality of lenses to an image side surface of a lens closest to the image side, TTL denotes a distance from the object side surface of the lens closest to the object side to the image sensor, D1 denotes an effective diameter of the lens closest to the object side, and D2 denotes an effective diameter of a lens at second location from the object side.

For example, the first light blocker may include a mask for blocking light.

For example, the first light blocker may include a part of a case in which the optical lens assembly is accommodated.

For example, the second light blocker may include a part of a barrel accommodating the plurality of lenses.

For example, the second light blocker may be arranged at an entrance of the barrel accommodating the plurality of lenses.

For example, a cover glass may be further arranged at the object side of the reflector, and the first light blocker may be arranged on an external surface or an internal surface of the cover glass.

For example, another reflector may be further arranged between the lens closest to the image side in the lens array and the image sensor.

For example, the optical lens assembly may satisfy following condition/equation.

$$1.5 < BFL/HHV < 2.2 \quad \text{Equation 4}$$

Here, BFL denotes a distance from an image side surface of the lens closest to the image side in the lens array to the image sensor, and HHV denotes an effective area size of the image sensor in the short side direction.

The optical lens assembly according to various embodiments, wherein the optical lens assembly focuses an image of an object on the image sensor, may include a reflector configured to reflect light that is incident without passing through a lens; and a lens array including a plurality of lenses arranged between the reflector and the image sensor, and the optical lens assembly may satisfy following conditions/equations.

$$LTTL/TTL < 0.5 \quad \text{Equation 2}$$

$$D1/D2 < 0.95 \quad \text{Equation 3}$$

Here, LTTL denotes a distance from the lens closest to the object side to the lens closest to the image side from among the plurality of lenses, TTL denotes a distance from the object side surface of the lens closest to the object side to the image sensor, D1 denotes an effective diameter of the lens closest to the object side, and D2 denotes an effective diameter of the second lens from the object side.

An electronic device according to various embodiments includes: an optical lens assembly focusing an image of an object; and an image sensor configured to receive the light focused by the optical lens assembly, and the optical lens assembly includes: a reflector configured to reflect incident light; a lens array including a plurality of lenses arranged between the reflector and the image sensor; a first light blocker arranged at the object side of the reflector to block the light; and a second light blocker arranged at the image side of the reflector to block the light, wherein the optical lens assembly includes a first optical axis of light proceeding towards the reflector and a second optical axis of light reflected by the reflector, and satisfies following condition/equation.

$$a \tan(LT1D/LT2D) \times 180/\pi > VHFOV \quad \text{Equation 1}$$

Here, assuming that a point where a first straight line extending from a first point of the first light blocker towards the first optical axis, wherein the first point is away from the image sensor based on the first optical axis on a cross-section of the optical lens assembly taken along the short side direction of the image sensor, in parallel with the first optical axis and a second straight line extending from a second point of the second light blocker towards the second optical axis, wherein the second point is adjacent to the first point based on the second optical axis, in parallel with the second optical axis meet each other is a point D, LT1D denotes a distance from the first point to the point D, LT2D denotes a distance from the second point to the point D, and VHFOV denotes a half field of view in the short side direction of the image sensor.

For example, the electronic device may further include another optical lens assembly, and the optical lens assembly may have a first viewing angle and another optical lens assembly may have a second viewing angle that is greater than the first viewing angle.

For example, a first image captured by the optical lens assembly and a second image captured by another optical lens assembly may be synthesized to generate a third image having a third viewing angle between the first viewing angle and the second viewing angle.

Each of the aforementioned components of the electronic device may include one or more parts, and a name of the part may vary with a type of the electronic device. The electronic device in accordance with various embodiments may include at least one of the aforementioned components, omit some of them, or include other additional components. Some of the components may be combined into an entity, but the entity may perform the same functions as the components may do.

The term "module" used herein may refer to a unit including one of hardware, software, and firmware, or a combination thereof. The term "module" may be interchangeably used with a unit, logic, logical block, component, or circuit. The "module" may be a minimum unit or part of an integrated component. The "module" may be a minimum unit or part of performing one or more functions. The "module" may be implemented mechanically or electronically. For example, the "module" may include at least one of application specific integrated circuit (ASIC) chips, field programmable gate arrays (FPGAs), or programmable logic arrays (PLAs) that perform some operations, which have already been known or will be developed in the future.

According to an embodiment, at least a part of the device (e.g., modules or their functions) or method (e.g., operations) may be implemented as instructions stored in a computer-readable storage medium e.g., in the form of a program module. The instructions, when executed by a processor (e.g., the processor 220 of FIG. 18), may enable the processor to carry out a corresponding function. The computer-readable storage medium may be, e.g., the memory 230.

The computer-readable storage medium may include a hardware device, such as hard discs, floppy discs, and magnetic tapes (e.g., a magnetic tape), optical media such as compact disc read only memories (ROMs) (CD-ROMs) and digital versatile discs (DVDs), magneto-optical media such as floptical disks, ROMs, random access memories (RAMs), flash memories, or the like. Examples of the program instructions may include not only machine language codes but also high-level language codes which are executable by various computing means by using an interpreter. The aforementioned hardware devices may be configured to operate as one or more software modules to carry out embodiments, and vice versa. Modules or programming modules in accordance with various embodiments may include at least one or more of the aforementioned components, omit some of them, or further include other additional components. Operations performed by modules, programming modules or other components in accordance with various embodiments may be carried out sequentially, simultaneously, repeatedly, or heuristically. Furthermore, some of the operations may be performed in a different order, or omitted, or include other additional operation(s).

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An optical lens assembly for focusing an image of an object on an image sensor, the optical lens assembly comprising:
    a reflector configured to reflect incident light;
    a lens array comprising a plurality of lenses arranged between the reflector and the image sensor;
    a first light blocker arranged at an object side of the reflector and configured to block light; and
    a second light blocker arranged at an image side of the reflector and configured to block light,
    wherein the optical lens assembly comprises:
        a first optical axis of light proceeding towards the reflector, and a second optical axis of light reflected by the reflector, and satisfies the following condition:

$a \tan(LT1D/LT2D) \times 180/\pi > VHFOV$, wherein the condition assumes that a point where a first straight line extends from a first point of the first light blocker towards the first optical axis, wherein the first point is away from the image sensor based on the first optical axis on a cross-section of the optical lens assembly taken along the short side direction of the image sensor, in parallel with the first optical axis, and a second straight line extends from a second point of the second light blocker towards the second optical axis, and wherein the second point is adjacent to the first point based on the second optical axis, in parallel with the second optical axis meet each other is a point D, LT1D denotes a distance from the first point to the point D, LT2D denotes a distance from the second point to the point D, and VHFOV denotes a half field of view in the short side direction of the image sensor.

2. The optical lens assembly of claim 1, wherein the reflector comprises a reflective mirror or a prism.

3. The optical lens assembly of claim 1, wherein a lens among the plurality of lenses is not arranged at the object side of the reflector.

4. The optical lens assembly of claim 1, wherein the lens array comprises three or more lenses.

5. The optical lens assembly of claim 1, wherein the lens array comprises:
   a first lens having a positive refractive power,
   a second lens having a negative refractive power, and
   a third lens having a positive refractive power.

6. The optical lens assembly of claim 4, wherein the lens array further comprises:
   a fourth lens having a positive refractive power,
   a fifth lens having a negative refractive power,
   a sixth lens having a meniscus shape concave towards the object side, and
   a seventh lens having a positive refractive power.

7. The optical lens assembly of claim 6, wherein the lens array further comprises:
   an eighth lens having a negative refractive power between the fifth lens and the sixth lens.

8. The optical lens assembly of claim 1,
wherein the optical lens assembly satisfies the following conditions:

$LTTL/TTL < 0.5$, and $D1/D2 < 0.95$, and wherein the LTTL denotes a distance from an object side surface of a lens closest to the object side from among a plurality of lenses to an image side surface of a lens closest to the image side, the TTL denotes a distance from the object side surface of the lens closest to the object side to the image sensor, the D1 denotes an effective diameter of the lens closest to the object side, and the D2 denotes an effective diameter of a second lens from the object side.

9. The optical lens assembly of claim 1, wherein the first light blocker comprises a mask for blocking light.

10. The optical lens assembly of claim 1, wherein the first light blocker comprises a part of a case in which the optical lens assembly is accommodated.

11. The optical lens assembly of claim 1, wherein the second light blocker comprises a part of a barrel accommodating the plurality of lenses.

12. The optical lens assembly of claim 1, wherein the second light blocker is arranged at an entrance of the barrel accommodating the plurality of lenses.

13. The optical lens assembly of claim 1, further comprising:
   a cover glass arranged at the object side of the reflector,
   wherein the first light blocker is arranged on an external surface or an internal surface of the cover glass.

14. The optical lens assembly of claim 1, further comprising:
   another reflector arranged between the lens closest to the image side in the lens array and the image sensor.

15. The optical lens assembly of claim 1,
wherein the optical lens assembly satisfies following condition:

ti $1.5 < BFL/HHV < 2.2$, and wherein the BFL denotes a distance from an image side surface of the lens closest to the image side in the lens array to the image sensor, and the HHV denotes an effective area size of the image sensor in a short side direction.

16. An optical lens assembly for focusing an image of an object on an image sensor, the optical lens assembly comprising:
   a reflector configured to reflect light that is incident without passing through a lens; and
   a lens array comprising a plurality of lenses arranged between the reflector and an image sensor,
wherein the optical lens assembly satisfies the following conditions:

$LTTL/TTL < 0.5$, and $D1/D2 < 0.95$, and wherein the LTTL denotes a distance from a lens closest to an object side to a lens closest to an image side from among the plurality of lenses, the TTL denotes a distance from an object side surface of the lens closest to the object side to the image sensor, the D1 denotes an effective diameter of the lens closest to the object side, and the D2 denotes an effective diameter of the second lens from the object side.

17. The optical lens assembly of claim 16, wherein the reflector comprises a reflective mirror or a prism.

18. The optical lens assembly of claim 16, wherein the lens array comprises three to five lenses.

19. The optical lens assembly of claim 16,
wherein the optical lens assembly satisfies following condition:

$1.5 < BFL/HHV < 2.2$, and wherein the BFL denotes a distance from an image side surface of the lens closest to the image side in the lens array to the image sensor, and the HHV denotes an effective area size of the image sensor in a short side direction.

20. An electronic device comprising:
   an optical lens assembly configured to image an object; and
   an image sensor configured to receive light focused by the optical lens assembly,
   wherein the optical lens assembly comprises:
     a reflector configured to reflect incident light;
     a lens array comprising a plurality of lenses arranged between the reflector and the image sensor;
     a first light blocker arranged at an object side of the reflector and configured to block light; and a second light blocker arranged at an image side of the reflector and configured to block light, wherein the optical lens assembly comprises:

a first optical axis of light proceeding towards the reflector, and a second optical axis of light reflected by the reflector, wherein the optical lens assembly satisfies the following condition:

$$a\tan(LT1D/LT2D) \times 180/\pi > VHFOV,$$

wherein the condition assumes that a point where a first straight line extends from a first point of the first light blocker towards the first optical axis, wherein the first point is away from the image sensor based on the first optical axis on a cross-section of the optical lens assembly taken along the short side direction of the image sensor, in parallel with the first optical axis, and a second straight line extends from a second point of the second light blocker towards the second optical axis, and wherein the second point is adjacent to the first point based on the second optical axis, in parallel with the second optical axis meet each other is a point D, the LT1D denotes a distance from the first point to the point D, the LT2D denotes a distance from the second point to the point D, and the VHFOV denotes a half field of view in the short side direction of the image sensor.

* * * * *